US010099692B2

United States Patent
Matsunaga et al.

(10) Patent No.: US 10,099,692 B2
(45) Date of Patent: Oct. 16, 2018

(54) CONTROL SYSTEM FOR VEHICLE

(71) Applicant: TOYOTA JIDOSHA KABUSHIKI KAISHA, Toyota-shi, Aichi-ken (JP)

(72) Inventors: Masaki Matsunaga, Odawara (JP); Yuichi Kumai, Gotemba (JP); Naoki Matsushita, Yamato (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 87 days.

(21) Appl. No.: 15/421,868

(22) Filed: Feb. 1, 2017

(65) Prior Publication Data
US 2017/0267241 A1 Sep. 21, 2017

(30) Foreign Application Priority Data

Mar. 15, 2016 (JP) ................................ 2016-051554

(51) Int. Cl.
*B60W 30/18* (2012.01)
*B60W 10/04* (2006.01)
(Continued)

(52) U.S. Cl.
CPC ...... *B60W 30/18009* (2013.01); *B60W 10/04* (2013.01); *B60W 10/184* (2013.01);
(Continued)

(58) Field of Classification Search
CPC .......... B60W 30/18009; B60W 10/04; B60W 10/184; B60W 10/20; B60W 30/12; B60W 30/16; B60W 50/10; B60W 50/12; B60W 50/14; B60W 2050/143; B60W 2050/146; B60W 2420/42; B60W 2420/52; B60W 2520/10; B60W 2520/105; B60W 2520/14; B60W 2520/04; B60W 2540/04; B60W 2550/10; B60W 2600/00; B60W 2750/30;
(Continued)

(56) References Cited

U.S. PATENT DOCUMENTS 8,670,891 B1    3/2014  Szybalski et al.
9,477,227 B2 *  10/2016 Hahne ................... B60W 30/09
(Continued)

FOREIGN PATENT DOCUMENTS

JP          9-86223 A    3/1997
JP       11-102157 A    4/1999
(Continued)

*Primary Examiner* — Nicholas Kiswanto
(74) *Attorney, Agent, or Firm* — Sughrue Mion, PLLC

(57) ABSTRACT

An automated driving control part including a package determining part determining a driver assistance package packaging permissions for a plurality of driver assistance operations based on at least one of surrounding environment information, host vehicle information, and driver information, a package proposing part proposing to the driver to switch to a driver assistance package so as to obtain permissions for driver assistance operations permitted in the driver assistance package, a judging part judging if a driver has authorized switching to the driver assistance package proposed by the package proposing part, and a package content providing part providing information relating to the content of the driver assistance package authorized by the driver through the information providing device to the driver.

16 Claims, 20 Drawing Sheets

| | OPERATION ASSISTANCE OPERATIONS | CLEAR | RAIN | HEAVY RAIN | SNOW | HEAVY SNOW | FOG | DENSE FOG | WIND | STRONG WIND |
|---|---|---|---|---|---|---|---|---|---|---|
| DRIVING ASSISTANCE FUNCTIONS | VEHICLE DISTANCE CONTROL | O | O | O | O | O | O | O | O | O |
| | LANE KEEPING CONTROL | O | O | × | O | × | O | × | O | O |
| | AUTOMATIC LANE CHANGE | O | × | × | × | × | × | × | × | × |
| | AUTOMATIC PASSING | O | × | × | × | × | × | × | × | × |
| | AUTOMATIC TURNOFF | O | × | × | × | × | × | × | O | × |
| | AUTOMATIC MERGING | O | × | × | × | × | × | × | O | × |
| VISIBILITY ASSISTANCE FUNCTIONS | LANE DEPARTURE WARNING | × | O | × | O | × | O | × | O | O |
| | BLIND SPOT MONITOR | × | O | × | O | × | O | × | O | O |
| | OTHER VEHICLE PROXIMITY WARNING | × | O | × | O | × | O | × | O | O |
| | PEDESTRIAN PROXIMITY WARNING | × | × | × | × | × | × | × | O | O |
| | HIGH BEAM AUTOMATIC CHANGE | × | × | × | × | × | × | × | × | × |
| | HEADLIGHT AUTOMATIC DIRECTION CONTROL | × | × | O | × | × | × | × | × | × |
| | HEADLIGHT/FOG LAMP AUTOMATIC TURN ON | × | × | O | × | × | O | O | × | × |
| | WIPER AUTOMATIC OPERATION | × | O | O | O | O | × | × | × | × |
| | DEFROSTER AUTOMATIC OPERATION | × | O | O | O | O | × | × | × | × |
| | NIGHT VIEW AUTOMATIC OPERATION | × | × | × | × | × | × | × | × | × |
| | PRESENTATION OF SURROUNDING SITUATION | × | × | × | × | × | × | × | × | × |
| CONGESTION ASSISTANCE FUNCTIONS | AUTOMATIC RESTART FROM STOPPED STATE AT TIME OF CONGESTION | × | × | × | × | × | × | × | × | × |
| | HAZARD LAMP TEMPORARY TURN ON CONTROL | × | × | × | × | × | × | × | × | × |
| | AIR-CONDITIONER INSIDE AIR CIRCULATION AUTOMATIC SWITCHING | × | × | × | × | × | × | × | × | × |
| | CHANGE OF SEAT POSITION | × | × | × | × | × | × | × | × | × |
| | PRESENTATION OF CONGESTION INFORMATION | × | × | × | × | × | × | × | × | × |
| | MOVIE PLAYBACK | × | × | × | × | × | × | × | × | × |
| | AUDIO VOLUME AUTOMATIC ADJUSTMENT | × | × | × | × | × | × | × | × | × |
| | JERK REDUCING RUNNING CONTROL | × | × | × | × | × | × | × | × | × |

(51) Int. Cl.

| | | |
|---|---|---|
| *B60W 10/184* | (2012.01) | |
| *B60W 10/20* | (2006.01) | |
| *B60W 30/12* | (2006.01) | |
| *B60W 30/16* | (2012.01) | |
| *B60W 50/10* | (2012.01) | |
| *B60W 50/12* | (2012.01) | |
| *B60W 50/14* | (2012.01) | |
| *G05D 1/02* | (2006.01) | |
| *G08G 1/16* | (2006.01) | |

(52) U.S. Cl.
CPC ............ *B60W 10/20* (2013.01); *B60W 30/12* (2013.01); *B60W 30/16* (2013.01); *B60W 50/10* (2013.01); *B60W 50/12* (2013.01); *B60W 50/14* (2013.01); *G05D 1/0219* (2013.01); *G08G 1/167* (2013.01); *B60W 2050/143* (2013.01); *B60W 2050/146* (2013.01); *B60W 2420/42* (2013.01); *B60W 2420/52* (2013.01); *B60W 2520/10* (2013.01); *B60W 2520/105* (2013.01); *B60W 2520/14* (2013.01); *B60W 2540/04* (2013.01); *B60W 2550/10* (2013.01); *B60W 2600/00* (2013.01); *B60W 2750/30* (2013.01); *G05D 2201/0213* (2013.01)

(58) Field of Classification Search
CPC ......... G05D 1/0219; G05D 2201/0213; G08G 1/167

See application file for complete search history.

(56) References Cited

U.S. PATENT DOCUMENTS

| | | | |
|---|---|---|---|
| 9,586,598 B2 * | 3/2017 | Iguchi | ................... B60W 50/14 |
| 2009/0243888 A1 | 10/2009 | Kawabata et al. | |
| 2015/0015416 A1 * | 1/2015 | Kim | ..................... G08G 1/0112 |
| | | | 340/870.07 |
| 2016/0009296 A1 | 1/2016 | Iguchi et al. | |
| 2017/0113686 A1 * | 4/2017 | Horita | ................... B60W 50/14 |

FOREIGN PATENT DOCUMENTS

| | | |
|---|---|---|
| JP | 2007-196854 A | 8/2007 |
| JP | 2007-290556 A | 11/2007 |
| JP | 2011-178272 A | 9/2011 |
| JP | 2012-207974 A | 10/2012 |
| JP | 2014-021767 A | 2/2014 |
| JP | 2015-074264 A | 4/2015 |
| JP | 2016-016765 A | 2/2016 |
| WO | 2012/131466 A1 | 10/2012 |

\* cited by examiner

FIG. 4

| | OPERATION ASSISTANCE OPERATIONS |
|---|---|
| DRIVING ASSISTANCE FUNCTIONS | VEHICLE DISTANCE CONTROL |
| | LANE KEEPING CONTROL |
| | AUTOMATIC LANE CHANGE |
| | AUTOMATIC PASSING |
| | AUTOMATIC TURNOFF |
| | AUTOMATIC MERGING |
| VISIBILITY ASSISTANCE FUNCTIONS | LANE DEPARTURE WARNING |
| | BLIND SPOT MONITOR |
| | OTHER VEHICLE PROXIMITY WARNING |
| | PEDESTRIAN PROXIMITY WARNING |
| | HIGH BEAM AUTOMATIC CHANGE |
| | HEADLIGHT AUTOMATIC DIRECTION CONTROL |
| | HEADLIGHT/FOG LAMP AUTOMATIC TURN ON |
| | WIPER AUTOMATIC OPERATION |
| | DEFROSTER AUTOMATIC OPERATION |
| | NIGHT VIEW AUTOMATIC OPERATION |
| | PRESENTATION OF SURROUNDING SITUATION |
| CONGESTION ASSISTANCE FUNCTIONS | AUTOMATIC RESTART FROM STOPPED STATE AT TIME OF CONGESTION |
| | HAZARD LAMP TEMPORARY TURN ON CONTROL |
| | AIR-CONDITIONER INSIDE AIR CIRCULATION AUTOMATIC SWITCHING |
| | CHANGE OF SEAT POSITION |
| | PRESENTATION OF CONGESTION INFORMATION |
| | MOVIE PLAYBACK |
| | AUDIO VOLUME AUTOMATIC ADJUSTMENT |
| | JERK REDUCING RUNNING CONTROL |

FIG. 5

| | OPERATION ASSISTANCE OPERATIONS | CLEAR | RAIN | HEAVY RAIN | SNOW | HEAVY SNOW | FOG | DENSE FOG | WIND | STRONG WIND |
|---|---|---|---|---|---|---|---|---|---|---|
| DRIVING ASSISTANCE FUNCTIONS | VEHICLE DISTANCE CONTROL | ○ | ○ | ○ | ○ | ○ | ○ | ○ | ○ | ○ |
| | LANE KEEPING CONTROL | ○ | ○ | × | ○ | × | ○ | × | ○ | ○ |
| | AUTOMATIC LANE CHANGE | ○ | × | × | × | × | × | × | × | × |
| | AUTOMATIC PASSING | ○ | × | × | × | × | × | × | × | × |
| | AUTOMATIC TURNOFF | ○ | × | × | × | × | ○ | × | ○ | × |
| | AUTOMATIC MERGING | ○ | × | × | × | × | × | × | ○ | × |
| | LANE DEPARTURE WARNING | × | ○ | × | ○ | × | ○ | × | ○ | ○ |
| | BLIND SPOT MONITOR | × | ○ | × | ○ | × | ○ | × | ○ | ○ |
| | OTHER VEHICLE PROXIMITY WARNING | × | ○ | × | ○ | × | ○ | × | ○ | ○ |
| | PEDESTRIAN PROXIMITY WARNING | × | × | × | × | × | × | × | ○ | × |
| | HIGH BEAM AUTOMATIC CHANGE | × | × | ○ | × | × | × | × | × | × |
| VISIBILITY ASSISTANCE FUNCTIONS | HEADLIGHT AUTOMATIC DIRECTION CONTROL | × | × | ○ | × | × | × | × | × | × |
| | HEADLIGHT/FOG LAMP AUTOMATIC TURN ON | × | × | ○ | × | × | ○ | ○ | × | × |
| | WIPER AUTOMATIC OPERATION | × | ○ | ○ | ○ | × | × | × | × | × |
| | DEFROSTER AUTOMATIC OPERATION | × | ○ | × | ○ | ○ | × | × | × | × |
| | NIGHT VIEW AUTOMATIC OPERATION | × | × | × | × | × | × | × | × | × |
| | PRESENTATION OF SURROUNDING SITUATION | × | × | × | × | × | × | × | × | × |
| | AUTOMATIC RESTART FROM STOPPED STATE AT TIME OF CONGESTION | × | × | × | × | × | × | × | × | × |
| | HAZARD LAMP TEMPORARY TURN ON CONTROL | × | × | × | × | × | × | × | × | × |
| | AIR-CONDITIONER INSIDE AIR CIRCULATION AUTOMATIC SWITCHING | × | × | × | × | × | × | × | × | × |
| CONGESTION ASSISTANCE FUNCTIONS | CHANGE OF SEAT POSITION | × | × | × | × | × | × | × | × | × |
| | PRESENTATION OF CONGESTION INFORMATION | × | × | × | × | × | × | × | × | × |
| | MOVIE PLAYBACK | × | × | × | × | × | × | × | × | × |
| | AUDIO VOLUME AUTOMATIC ADJUSTMENT | × | × | × | × | × | × | × | × | × |
| | JERK REDUCING RUNNING CONTROL | × | × | × | × | × | × | × | × | × |

FIG. 6

| | OPERATION ASSISTANCE OPERATIONS | DAY | NIGHT |
|---|---|---|---|
| DRIVING ASSISTANCE FUNCTIONS | VEHICLE DISTANCE CONTROL | O | O |
| | LANE KEEPING CONTROL | O | O |
| | AUTOMATIC LANE CHANGE | O | O |
| | AUTOMATIC PASSING | O | O |
| | AUTOMATIC TURNOFF | O | O |
| | AUTOMATIC MERGING | O | O |
| VISIBILITY ASSISTANCE FUNCTIONS | LANE DEPARTURE WARNING | X | X |
| | BLIND SPOT MONITOR | X | X |
| | OTHER VEHICLE PROXIMITY WARNING | X | X |
| | PEDESTRIAN PROXIMITY WARNING | X | X |
| | HIGH BEAM AUTOMATIC CHANGE | X | O |
| | HEADLIGHT AUTOMATIC DIRECTION CONTROL | X | O |
| | HEADLIGHT/FOG LAMP AUTOMATIC TURN ON | X | X |
| | WIPER AUTOMATIC OPERATION | X | X |
| | DEFROSTER AUTOMATIC OPERATION | X | X |
| | NIGHT VIEW AUTOMATIC OPERATION | X | O |
| | PRESENTATION OF SURROUNDING SITUATION | X | X |
| CONGESTION ASSISTANCE FUNCTIONS | AUTOMATIC RESTART FROM STOPPED STATE AT TIME OF CONGESTION | X | X |
| | HAZARD LAMP TEMPORARY TURN ON CONTROL | X | X |
| | AIR-CONDITIONER INSIDE AIR CIRCULATION AUTOMATIC SWITCHING | X | X |
| | CHANGE OF SEAT POSITION | X | X |
| | PRESENTATION OF CONGESTION INFORMATION | X | X |
| | MOVIE PLAYBACK | X | X |
| | AUDIO VOLUME AUTOMATIC ADJUSTMENT | X | X |
| | JERK REDUCING RUNNING CONTROL | X | X |

FIG. 7

| | OPERATION ASSISTANCE OPERATIONS | GENERAL ROAD | TRUNK ROAD | INTERCITY EXPRESSWAY | METROPOLITAN EXPRESSWAY |
|---|---|---|---|---|---|
| DRIVING ASSISTANCE FUNCTIONS | VEHICLE DISTANCE CONTROL | ○ | ○ | ○ | ○ |
| | LANE KEEPING CONTROL | ○ | ○ | ○ | ○ |
| | AUTOMATIC LANE CHANGE | ○ | × | × | × |
| | AUTOMATIC PASSING | ○ | × | × | × |
| | AUTOMATIC TURNOFF | ○ | × | × | × |
| | AUTOMATIC MERGING | ○ | ○ | × | ○ |
| | LANE DEPARTURE WARNING | ○ | ○ | × | ○ |
| | BLIND SPOT MONITOR | ○ | × | × | × |
| | OTHER VEHICLE PROXIMITY WARNING | ○ | × | × | × |
| | PEDESTRIAN PROXIMITY WARNING | ○ | × | × | × |
| | HIGH BEAM AUTOMATIC CHANGE | ○ | ○ | ○ | × |
| VISIBILITY ASSISTANCE FUNCTIONS | HEADLIGHT AUTOMATIC DIRECTION CONTROL | ○ | × | ○ | × |
| | HEADLIGHT/FOG LAMP AUTOMATIC TURN ON | ○ | × | × | × |
| | WIPER AUTOMATIC OPERATION | × | × | × | ○ |
| | DEFROSTER AUTOMATIC OPERATION | × | × | × | × |
| | NIGHT VIEW AUTOMATIC OPERATION | × | × | × | × |
| | PRESENTATION OF SURROUNDING SITUATION | × | × | × | × |
| CONGESTION ASSISTANCE FUNCTIONS | AUTOMATIC RESTART FROM STOPPED STATE AT TIME OF CONGESTION | × | × | × | × |
| | HAZARD LAMP TEMPORARY TURN ON CONTROL | × | × | × | × |
| | AIR-CONDITIONER INSIDE AIR CIRCULATION AUTOMATIC SWITCHING | × | × | × | × |
| | CHANGE OF SEAT POSITION | × | × | × | × |
| | PRESENTATION OF CONGESTION INFORMATION | × | × | × | × |
| | MOVIE PLAYBACK | × | × | × | × |
| | AUDIO VOLUME AUTOMATIC ADJUSTMENT | × | × | × | × |
| | JERK REDUCING RUNNING CONTROL | × | × | × | × |

FIG. 8

| | OPERATION ASSISTANCE OPERATIONS | CONGESTED | NOT CONGESTED |
|---|---|---|---|
| DRIVING ASSISTANCE FUNCTIONS | VEHICLE DISTANCE CONTROL | O | O |
| | LANE KEEPING CONTROL | O | O |
| | AUTOMATIC LANE CHANGE | × | O |
| | AUTOMATIC PASSING | × | O |
| | AUTOMATIC TURNOFF | O | O |
| | AUTOMATIC MERGING | O | O |
| VISIBILITY ASSISTANCE FUNCTIONS | LANE DEPARTURE WARNING | O | × |
| | BLIND SPOT MONITOR | O | × |
| | OTHER VEHICLE PROXIMITY WARNING | O | × |
| | PEDESTRIAN PROXIMITY WARNING | O | × |
| | HIGH BEAM AUTOMATIC CHANGE | O | × |
| | HEADLIGHT AUTOMATIC DIRECTION CONTROL | O | × |
| | HEADLIGHT/FOG LAMP AUTOMATIC TURN ON | O | × |
| | WIPER AUTOMATIC OPERATION | O | × |
| | DEFROSTER AUTOMATIC OPERATION | O | × |
| | NIGHT VIEW AUTOMATIC OPERATION | O | × |
| | PRESENTATION OF SURROUNDING SITUATION | O | × |
| CONGESTION ASSISTANCE FUNCTIONS | AUTOMATIC RESTART FROM STOPPED STATE AT TIME OF CONGESTION | O | × |
| | HAZARD LAMP TEMPORARY TURN ON CONTROL | O | × |
| | AIR-CONDITIONER INSIDE AIR CIRCULATION AUTOMATIC SWITCHING | O | × |
| | CHANGE OF SEAT POSITION | O | × |
| | PRESENTATION OF CONGESTION INFORMATION | O | × |
| | MOVIE PLAYBACK | O | × |
| | AUDIO VOLUME AUTOMATIC ADJUSTMENT | O | × |
| | JERK REDUCING RUNNING CONTROL | O | × |

FIG. 9

| | OPERATION ASSISTANCE OPERATIONS | SLEEPY | TIRED | OVERWORKED | DISTRACTED | NORMAL |
|---|---|---|---|---|---|---|
| DRIVING ASSISTANCE FUNCTIONS | VEHICLE DISTANCE CONTROL | ○ | ○ | ○ | ○ | ○ |
| | LANE KEEPING CONTROL | ○ | ○ | ○ | ○ | ○ |
| | AUTOMATIC LANE CHANGE | × | ○ | × | × | ○ |
| | AUTOMATIC PASSING | ○ | × | × | × | ○ |
| | AUTOMATIC TURNOFF | ○ | × | ○ | × | ○ |
| | AUTOMATIC MERGING | × | × | × | × | × |
| | LANE DEPARTURE WARNING | × | × | × | × | × |
| | BLIND SPOT MONITOR | × | × | × | × | × |
| | OTHER VEHICLE PROXIMITY WARNING | × | × | × | × | × |
| | PEDESTRIAN PROXIMITY WARNING | × | × | × | × | × |
| | HIGH BEAM AUTOMATIC CHANGE | × | × | × | × | × |
| VISIBILITY ASSISTANCE FUNCTIONS | HEADLIGHT AUTOMATIC DIRECTION CONTROL | × | × | × | × | × |
| | HEADLIGHT/FOG LAMP AUTOMATIC TURN ON | × | × | × | × | × |
| | WIPER AUTOMATIC OPERATION | × | × | × | × | × |
| | DEFROSTER AUTOMATIC OPERATION | × | × | × | × | × |
| | NIGHT VIEW AUTOMATIC OPERATION | × | × | × | × | × |
| | PRESENTATION OF SURROUNDING SITUATION | × | × | × | × | × |
| CONGESTION ASSISTANCE FUNCTIONS | AUTOMATIC RESTART FROM STOPPED STATE AT TIME OF CONGESTION | × | × | × | × | × |
| | HAZARD LAMP TEMPORARY TURN ON CONTROL | × | × | × | × | × |
| | AIR-CONDITIONER INSIDE AIR CIRCULATION AUTOMATIC SWITCHING | × | × | × | × | × |
| | CHANGE OF SEAT POSITION | × | × | × | × | × |
| | PRESENTATION OF CONGESTION INFORMATION | × | × | × | × | × |
| | MOVIE PLAYBACK | × | × | × | × | × |
| | AUDIO VOLUME AUTOMATIC ADJUSTMENT | × | × | × | × | × |
| | JERK REDUCING RUNNING CONTROL | × | × | × | × | × |

FIG. 10

| | OPERATION ASSISTANCE OPERATIONS | UNSTABLE | STABLE |
|---|---|---|---|
| DRIVING ASSISTANCE FUNCTIONS | VEHICLE DISTANCE CONTROL | ○ | ○ |
| | LANE KEEPING CONTROL | ○ | ○ |
| | AUTOMATIC LANE CHANGE | × | ○ |
| | AUTOMATIC PASSING | × | ○ |
| | AUTOMATIC TURNOFF | × | ○ |
| | AUTOMATIC MERGING | × | ○ |
| VISIBILITY ASSISTANCE FUNCTIONS | LANE DEPARTURE WARNING | × | × |
| | BLIND SPOT MONITOR | × | × |
| | OTHER VEHICLE PROXIMITY WARNING | × | × |
| | PEDESTRIAN PROXIMITY WARNING | × | × |
| | HIGH BEAM AUTOMATIC CHANGE | × | × |
| | HEADLIGHT AUTOMATIC DIRECTION CONTROL | × | × |
| | HEADLIGHT/FOG LAMP AUTOMATIC TURN ON | × | × |
| | WIPER AUTOMATIC OPERATION | × | × |
| | DEFROSTER AUTOMATIC OPERATION | × | × |
| | NIGHT VIEW AUTOMATIC OPERATION | × | × |
| | PRESENTATION OF SURROUNDING SITUATION | × | × |
| CONGESTION ASSISTANCE FUNCTIONS | AUTOMATIC RESTART FROM STOPPED STATE AT TIME OF CONGESTION | × | × |
| | HAZARD LAMP TEMPORARY TURN ON CONTROL | × | × |
| | AIR-CONDITIONER INSIDE AIR CIRCULATION AUTOMATIC SWITCHING | × | × |
| | CHANGE OF SEAT POSITION | × | × |
| | PRESENTATION OF CONGESTION INFORMATION | × | × |
| | MOVIE PLAYBACK | × | × |
| | AUDIO VOLUME AUTOMATIC ADJUSTMENT | × | × |
| | JERK REDUCING RUNNING CONTROL | × | × |

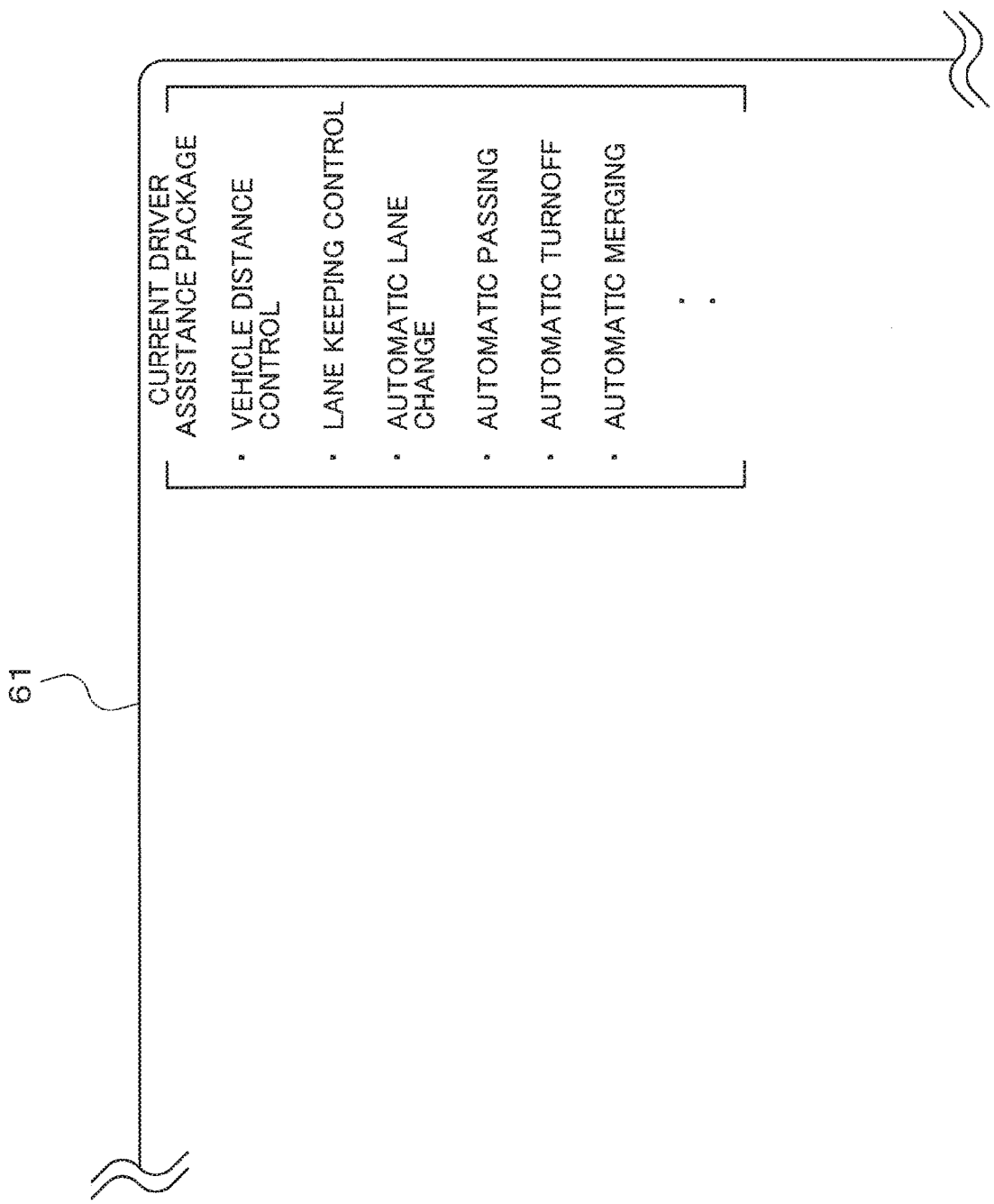

CONTROL SYSTEM FOR VEHICLE

CROSS-REFERENCE TO RELATED APPLICATION

This application claims priority based on Japanese Patent Application No. 2016-051544 filed with the Japan Patent Office on Mar. 15, 2016, the entire contents of which are incorporated into the present specification by reference.

TECHNICAL FIELD

The present invention relates to a control system for a vehicle.

BACKGROUND ART

The specification of U.S. Pat. No. 8,670,891 discloses a conventional control system for a vehicle in which when a driver operates a switch to change from a manual driving mode to an automated driving mode, the distance between vehicles is controlled, lanes are kept, and other driver assistance operations are automatically performed as automated driving.

SUMMARY

However, the conventional control system of a vehicle explained above used the fact of being switched to the automated driving mode to judge whether the driver gave permission for all of the driver assistance operations. For this reason, the driver could only perform an operation for switching from the manual driving mode to the automated driving mode for performing automated driving and could not freely set permission for the individual driver assistance operations. In this way, in the state where there is a possibility of all of the driver assistance operations being performed, driver assistance operations unnecessary to the driver are liable to be performed during the automated driving. Further, it is difficult to predict what kind of driver assistance operations will be performed next during automated driving and the driver is liable to have to intervene in operation (so-called override). For this reason, there was the problem that the frequency by which the driver felt uneasy during automated driving easily increased.

Therefore, in performing automated driving, it is preferable that the driver be able to set permission for individual driver assistance operations before the start of automated driving or in accordance with the situation on the ground during automated driving. However, the situation on the ground changes with each instant while the vehicle is being driven, so there was the problem that it was difficult for the driver to set permission for individual driver assistance operations by himself and set automated driving tailored to the situation on the ground.

The present invention was made in consideration of such a problem and has as its object to enable automated driving tailored to the actual situation to be easily set by the driver while lessening any uneasy feeling felt by the driver during automated driving.

To solve this problem, according to one aspect of the present invention, there is provided a control system of a vehicle in the case of controlling a vehicle equipped with a surrounding environment information acquiring device for acquiring surrounding environment information relating to surrounding environmental conditions of a host vehicle, a host vehicle information acquiring device for acquiring host vehicle information relating to conditions of the host vehicle, a driver information acquiring device for acquiring driver information relating to conditions of a driver of the host vehicle, and an information providing device for providing information to the driver of the host vehicle. The control system is provided with an automated driving control part configured to automatically perform driver assistance operations for which the driver has given permission among a plurality of driver assistance operations. The automated driving control part comprises a package determining part configured to determine a driver assistance package packaging permissions for a plurality of driver assistance operations based on at least one of the surrounding environment information, the host vehicle information, and the driver information, a package proposing part configured to propose to the driver to switch to a driver assistance package so as to obtain permissions for the individual driver assistance operations permitted in the driver assistance package, a judging part configured to judge whether the driver has authorized switching to the driver assistance package proposed by the package proposing part, and a package content providing part configured to provide information relating to the content of the driver assistance package authorized by the driver to the driver through the information providing device.

According to this aspect of the present invention, it is possible to enable automated driving tailored to the situation on the ground to be simply set by the driver while lessening any uneasy feeling felt by the driver during automated driving.

BRIEF DESCRIPTION OF THE DRAWINGS

FIG. 4 is a view showing a list of driver assistance operations performed during an automated driving mode.

FIG. 5 is a view showing a group of packages relating to weather conditions.

FIG. 6 is a view showing a group of packages relating to sunlight conditions.

FIG. 7 is a view showing a group of packages relating to road types.

FIG. 8 is a view showing a group of packages relating to road conditions.

FIG. 9 is a view showing a group of packages relating to driver conditions.

FIG. 10 is a view showing a group of packages relating to host vehicle conditions.

FIG. 11 is a view showing one example of display of text information of the permitted driver assistance operations in the driver assistance package on a display.

DESCRIPTION OF EMBODIMENTS

Figure 1:
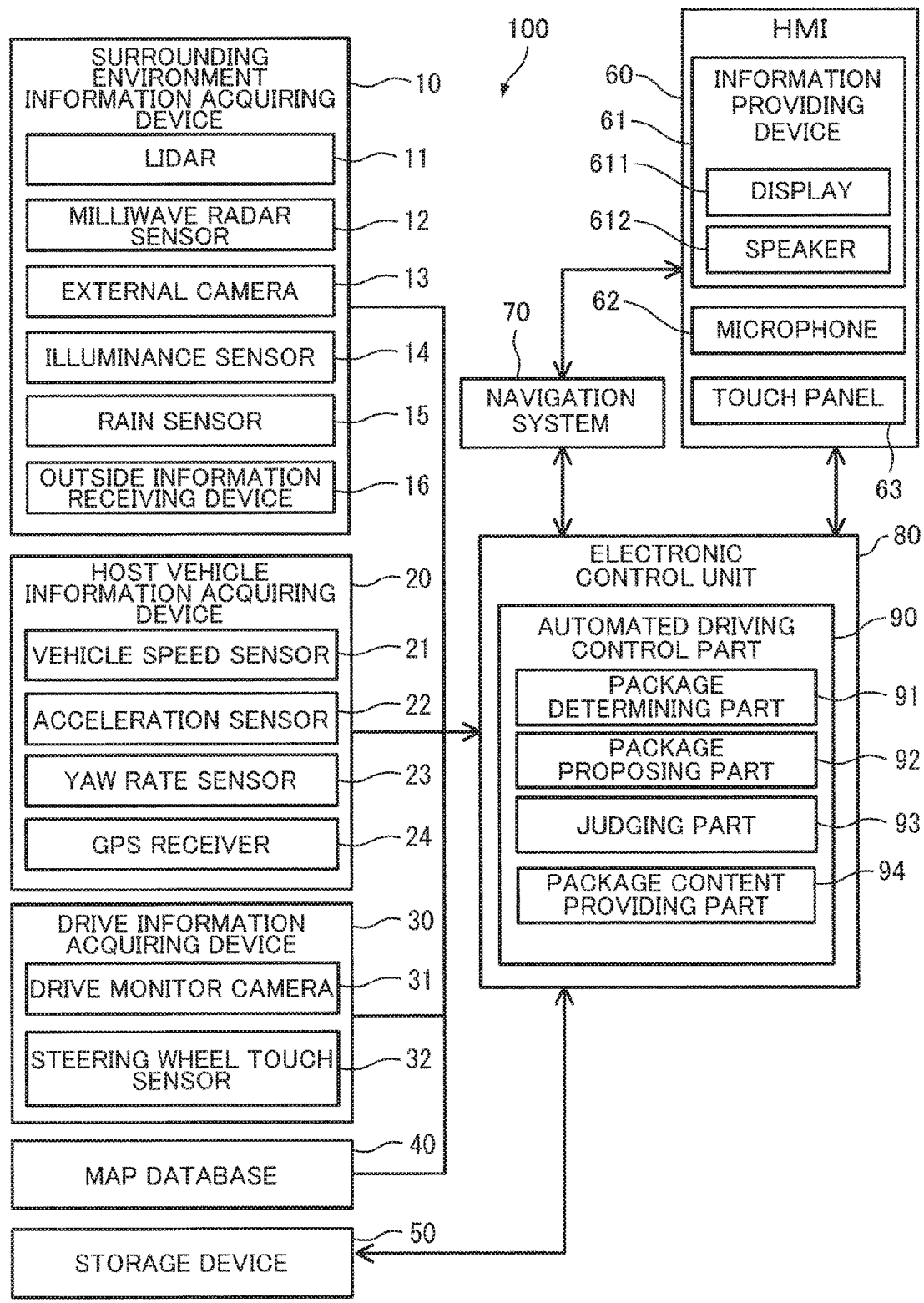
FIG. 1 is a schematic view of the configuration of an automated driving system according to a first embodiment of the present invention.

Below, referring to the drawings, embodiments of the present invention will be explained in detail. Note that, in the following explanation, similar component elements will be assigned the same reference notations.

First Embodiment

Figure 2:
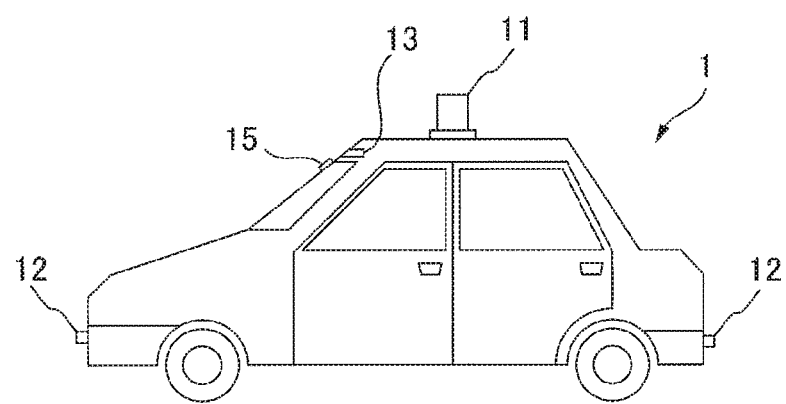
FIG. 2 is a schematic view of the appearance of a host vehicle mounting an automated driving system according to the first embodiment of the present invention.
Figure 3:
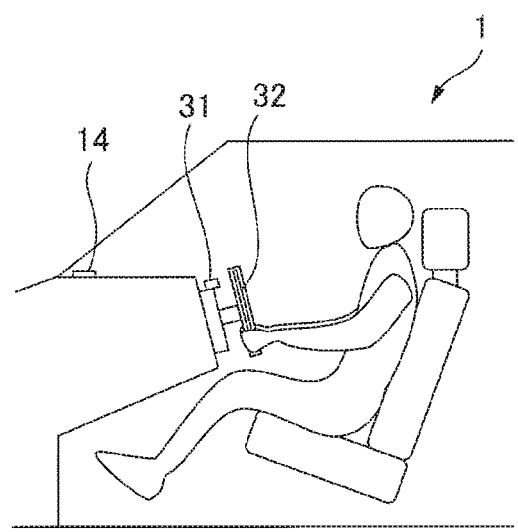
FIG. 3 is a schematic view of the inside of a host vehicle mounting an automated driving system according to the first embodiment of the present invention.

FIG. 1 is a schematic view of the configuration of an automated driving system 100 of a vehicle according to a first embodiment of the present invention. FIG. 2 is a schematic view of the appearance of a host vehicle 1 mounting the automated driving system 100 according to the present embodiment. FIG. 3 is a schematic view of the inside of the host vehicle 1 mounting the automated driving system 100 according to the present embodiment.

As shown in FIG. 1, the automated driving system 100 according to the present embodiment is provided with a surrounding environment information acquiring device 10, a host vehicle information acquiring device 20, a driver information acquiring device 30, a map database 40, a storage device 50, a human-machine interface (below, referred to as an "HMI") 60, a navigation system 70, and an electronic control unit 80.

The surrounding environment information acquiring device 10 is a device for acquiring information relating to obstacles in the surroundings of the host vehicle (for example, buildings, moving vehicles such as vehicles in front of it and in back of it on the road and oncoming vehicles, stopped vehicles, the curb, fallen objects, pedestrians, etc.) and the weather and other such surrounding environmental conditions of the host vehicle 1 (below, referred to as the "surrounding environment information"). As shown in FIG. 1 to FIG. 3, the surrounding environment information acquiring device 10 according to the present embodiment is provided with a LIDAR (laser imaging detection and ranging) device 11, milliwave radar sensors 12, an external camera 13, illuminance sensor 14, rain sensor 15, and outside information receiving device 16.

The LIDAR device 11 uses laser beams to detect the road and obstacles in the host vehicle surroundings. As shown in FIG. 2, in the present embodiment, the LIDAR device 11 is, for example, attached to the roof of the host vehicle 1. The LIDAR device 11 successively fires laser beams toward the overall surroundings of the host vehicle 1 and measures the distances to the road and host vehicle surroundings from the reflected light. Further, the LIDAR device 11 uses the results of measurement as the basis to generate 3D images of the road and obstacles in the overall surroundings of the host vehicle 1 and sends information of the generated 3D images to the electronic control unit 80.

The milliwave radar sensors 12 utilize electromagnetic waves to detect obstacles in the host vehicle surroundings at a farther distance than the LIDAR device 11. As shown in FIG. 2, in the present embodiment, the milliwave radar sensors 12, for example, are attached to the front bumper and rear bumper of the host vehicle 1. The milliwave radar sensors 12 emit electromagnetic waves to the surroundings of the host vehicle 1 (in the present embodiment, the front, rear, and sides of the host vehicle 1) and use the reflected waves to measure the distances to obstacles in the host vehicle surroundings and the relative speed with the obstacles. Further, the milliwave radar sensors 12 send the results of measurement as host vehicle surrounding information to the electronic control unit 80.

Note that, the locations of attachment of the milliwave radar sensors 12 are not particularly limited so long as locations where the necessary host vehicle surrounding information can be acquired. For example, they may also be attached to the grilles or to the insides of the headlights or brake lights and other such lights of the host vehicle 1 or may be attached to parts of the body (frame) of the host vehicle 1.

The external camera 13 captures an image of the area in front of the host vehicle 1. As shown in FIG. 2, in the present embodiment, the external camera 13 is, for example, attached to the center part of the front of the roof of the host vehicle 1. The external camera 13 processes the captured image of the area in front of the host vehicle to detect information on obstacles in front of the host vehicle, the width of the lane of the road driven on and the road shape, road signs, white lines, the state of traffic lights, and other road information in the area in front of the host vehicle, the yaw angle (relative direction of vehicle with respect to lane driven on), the offset position of the vehicle from the center of the lane driven on, and other such driving information of the host vehicle 1, rain or snow or fog and other such weather information of the host vehicle surroundings, etc. Further, the external camera 13 sends the detected image information to the electronic control unit 80.

Note that, the location of attachment of the external camera 13 is not particularly limited so long as a location able to capture an image of the area in front of the host vehicle 1. For example, the camera may also be attached to the top of the center part of the back surface of the front glass of the host vehicle.

The illuminance sensor 14 detects the illuminance in the host vehicle surroundings. As shown in FIG. 2, in the present embodiment, the illuminance sensor 14 is, for example, attached to the top surface of the instrument panel of the host vehicle. The illuminance sensor 14 sends the detected illuminance information of the host vehicle surroundings to the electronic control unit 80.

The rain sensor 15 detects the presence of rainfall and the amount of rainfall. As shown in FIG. 2, in the present embodiment, the rain sensor 15 is, for example, attached to the top of the center of the front surface of the front glass of the host vehicle 1. The rain sensor 15 fires light generated by a built-in light emitting diode toward the front surface of the front glass and measures the change in the reflected light at that time so as to detect the presence of rainfall, the amount of rainfall, and other rainfall information. Further, the rain sensor 15 sends the detected rainfall information to the electronic control unit 80.

The outside information receiving device 16, for example, receives congestion information, weather information (rain, snow, fog, wind speed, and other information), and other outside information road sent from a traffic information communication system center or other outside communication center. The outside information receiving device 16 sends the received outside information to the electronic control unit 80.

The host vehicle information acquiring device 20 is a device for acquiring a speed or acceleration, posture, and current position of the host vehicle 1 and other such information relating to the conditions of the host vehicle 1 (below, referred to as "host vehicle information"). As shown in FIG. 1, the host vehicle information acquiring device 20 according to the present embodiment is provided with a vehicle speed sensor 21, acceleration sensor 22, yaw rate sensor 23, and GPS receiver 24.

The vehicle speed sensor 21 is a sensor for detecting the speed of the host vehicle 1. The vehicle speed sensor 21 sends the detected vehicle speed information of the host vehicle 1 to the electronic control unit 80.

The acceleration sensor 22 is a sensor for detecting the acceleration of the host vehicle 1 at the time of accelerating or the time of braking. The acceleration sensor 22 sends the detected acceleration information of the host vehicle 1 to the electronic control unit 80.

The yaw rate sensor 23 is a sensor for detecting the posture of the host vehicle 1, more specifically detects the speed of change of the yaw angle at the time the host vehicle 1 turns, that is, the rotational angular speed (yaw rate) about the vertical axis of the host vehicle 1. The yaw rate sensor 23 sends the detected posture information of the host vehicle 1 to the electronic control unit 80.

The GPS receiver 24 receives signals from three or more GPS satellites to identify the longitude and latitude of the host vehicle 1 and detect the current position of the host vehicle 1. The GPS receiver 24 sends the detected current position information of the host vehicle 1 to the electronic control unit 80.

The driver information acquiring device 30 is a device for acquiring information relating to the condition of the driver of the host vehicle 1 (below, referred to as the "driver information"). As shown in FIG. 1 and FIG. 3, the driver information acquiring device 30 according to the present embodiment is provided with a driver monitor camera 31 and a steering wheel touch sensor 32.

The driver monitor camera 31 is attached to the top surface of the steering wheel column cover and captures an image of the appearance of the driver. The driver monitor camera 31 processes the captured image of the driver to detect information on the driver (direction of face of driver, degree of opening of eyes, etc.) and information on the appearance of the driver such as his posture. Further, the driver monitor camera 31 sends the detected information of the appearance of the driver to the electronic control unit 80.

The steering wheel touch sensor 32 is attached to the steering wheel. The steering wheel touch sensor 32 detects whether the driver is gripping the steering wheel and sends the detected information on the gripping of the steering wheel to the electronic control unit 80.

The map database 40 is a database relating to map information. This map database 40 is for example stored in a hard disk drive (HDD) mounted in the vehicle. The map information includes positional information on the roads, information on the road shapes (for example, curves or straight stretches, curvature of curves, etc.), positional information on the intersections and turn-off points, information on the road types, etc.

The storage device 50 stores a road map designed for automated driving. The automated driving use road map is prepared by the electronic control unit 80 based on the 3D image generated by the LIDAR device 11 and constantly or periodically updated by the electronic control unit 80.

The HMI 60 is an interface for input and output of information between the driver or a passenger with the automated driving system 100. The HMI 60 according to the present embodiment is provided with an information providing device 61 for providing the driver with various types of information, a microphone 62 for recognizing voice commands of the driver, and a touch panel (or operating buttons) 63 for the driver to input information.

The information providing device 61 is provided with a display 611 for displaying text information or image information and a speaker 612 for generating sound.

The navigation system 70 is an apparatus for guiding the host vehicle 1 to a destination set by the driver through the HMI 60. The navigation system 70 uses the current position information of the host vehicle 1 detected by the GPS receiver 24 and map information of the map database 40 as the basis to calculate the target route to the destination and transmits the information of the calculated target route as navigation information to the electronic control unit 80.

The electronic control unit 80 is a microcomputer comprised of components connected with each other by a bidirectional bus such as a central processing unit (CPU), read only memory (ROM), random access memory (RAM), input port, and output port.

The electronic control unit 80 is provided with an automated driving control part 90 automatically performing driver assistance operations permitted by the driver from among the individual driver assistance operations shown in FIG. 4 when the driver switches from the manual driving mode (mode where driver performs driving operations relating to accelerating, steering, and braking) to the automated driving mode. The automated driving control part 90 is provided with a package determining part 91, package proposing part 92, judging part 93, and package content providing part 94. It controls the various control components for performing the different driver assistance operations or providing information to the driver and automatically drives the vehicle based on information input to the electronic control unit 80 such as the surrounding environment information, host vehicle information, driver information, navigation information, and various other information required for automated driving.

FIG. 4 is a view showing a list of driver assistance operations performed in the automated driving mode in the present embodiment.

As shown in FIG. 4, in the present embodiment, the driver assistance operations are roughly divided by functions into three groups of functions of driving assistance functions, visibility assistance functions, and congestion assistance functions.

The driver assistance operations classified as "driving assistance functions" are the driver assistance operations having the function of performing at least one of accelerating, steering, and braking (driving assistance functions) among the driver assistance operations. In the present embodiment, as driver assistance operations having driving assistance functions, vehicle distance control, lane keeping control, automatic lane change, automatic passing, automatic turn off, and automatic merging are illustrated, but the driver assistance operations having the driving assistance functions are not limited to these. It is possible to increase these or reduce these from those illustrated in FIG. 4 as needed.

Note that the vehicle distance control is control for automatically adjusting the vehicle speed within the range of the restricted vehicle speed so as to follow a vehicle in front by matching the change in speed of that vehicle while maintaining a suitable vehicle distance corresponding to the vehicle speed. The lane keeping control is control for automatically adjusting the amount of steering or vehicle speed so that the host vehicle 1 runs along a suitable running line corresponding to the width of the lane driven in.

The driver assistance operations classified as "visibility assistance functions" are the driver assistance operations having the functions of securing visibility to the driver and turn safety (visibility assistance functions) in the driver assistance operations not having driving assistance functions (that is, not performing any of accelerating, steering, and braking). In the present embodiment, as driver assistance operations having visibility assistance functions, 11 driver assistance operations such as lane departure warning and blind spot monitoring are illustrated, but the driver assistance operations having the visibility assistance functions are not limited to these. It is possible to increase these or reduce these from those illustrated in FIG. 4 as needed.

The driver assistance operations classified as "congestion assistance functions" are the driver assistance operations having the function of easing the fatigue of the driver and passengers at the time of congestion (congestion assistance functions). In the present embodiment, as driver assistance operations having congestion assistance functions, eight driver assistance operations such as automatic restart from a stopped state at the time of congestion or control for temporarily turning on the hazard lamps are illustrated, but the driver assistance operations having congestion assistance functions are not limited to these. It is possible to increase these or reduce these from those illustrated in FIG. 4 as needed.

Here, as explained above, if being switched from the manual driving mode to the automated driving mode, automated driving automatically performing driver assistance operations permitted by the driver among the individual driver assistance operations are performed. In performing such automated driving, it is preferable to enable the driver to set permission for individual driver assistance operations in accordance with the surrounding environment conditions or the host vehicle conditions or driver conditions before the start of or during automated driving.

However, if a driver has to set permission for individual driver assistance operations one by one for performing automated driving, it becomes extremely troublesome and the convenience of the automated driving is lost. Further, the surrounding environment conditions and the host vehicle conditions and driver conditions change with each instant while the vehicle is being driven. For this reason, it is difficult for the driver to set permission for the individual driver assistance operations by himself while the vehicle is being driven and to set automated driving tailored to these conditions.

Therefore, in the present embodiment, the surrounding environment information, host vehicle information, and driver information are used as the basis to determine a driver assistance package packaging together permissions for the individual driver assistance operations and the determined driver assistance package is proposed to the driver. Specifically, the optimal unit packages corresponding to the weather condition, sunlight condition, road type, road condition, driver condition, and host vehicle condition are selected from the groups of packages shown in FIG. 5 to FIG. 10 and the selected unit packages are combined. The thus determined driver assistance package is proposed to the driver.

Due to this, when performing automated driving automatically performing permitted driver assistance operations from among a plurality of driver assistance operations, if the surrounding environment conditions, host vehicle conditions, and driver conditions change, it is possible to propose to the driver a driver assistance package tailored to the changed conditions each time. The driver assistance package proposed to the driver packages in advance the permissions of the individual driver assistance operations, so the driver no longer needs to set permissions for the individual driver assistance operations. For this reason, it is possible for a driver to simply set automated driving tailored to the surrounding environment conditions, host vehicle conditions, and driver conditions.

On the other hand, after a proposed driver assistance package is authorized by the driver, the driver assistance operations permitted by the driver, that is, the permitted driver assistance operations in the driver assistance package authorized by the driver, are automatically performed.

At this time, if what kind of driver assistance operations will be automatically performed by the authorized driver assistance package are not known, it will become difficult to predict what kind of driver assistance operations will be performed during the automated driving. For this reason, even if certain driver assistance operations were permitted, during automated driving, the driver might lose his patience and end up performing the driver assistance operations on his own and thereby intervening in (overriding) the operation. As a result, the driver might get a uneasy feeling during automated driving.

Therefore, after the driver authorizes the proposed driver assistance package, it is preferable to provide information relating to the content of the driver assistance package through the information providing device 61 to the driver and enable the driver to obtain a grasp of what kind of driver assistance operations will be automatically performed by the authorized driver assistance package.

Therefore, in the present embodiment, furthermore, it is judged if the driver has authorized switching to the proposed driver assistance package and information relating to the content of the driver assistance package authorized by the driver is proposed to the driver through the information providing device 61.

Below, referring to FIG. 5 to FIG. 10, the individual groups of packages will be explained. Note that in FIG. 5 to FIG. 10, the circles show permission and the x's show no permission. Further, the individual groups of packages are stored in the ROM of the electronic control unit 80.

FIG. 5 is a view showing the group of packages relating to weather conditions. The group of packages relating to weather conditions roughly classify weather conditions into the nine conditions of "clear", "rain", "heavy rain", "snow", "heavy snow", "fog", "dense fog", "wind", and "strong wind" and package permissions for the individual driver assistance operations for each of the weather conditions.

In the present embodiment, weather information of the host vehicle surroundings detected by the external camera 13 (rain or snow, fog, wind speed, and other information) and weather information included in the outside information received by the outside information receiving device 16 (rain or snow, fog, wind speed, and other information) are used as the basis to judge the weather condition.

FIG. 6 is a view showing the group of packages relating to sunlight conditions. The group of packages relating to sunlight conditions roughly classify the sunlight conditions into "day" and "night" and package permissions for the individual driver assistance operations for each of the sunlight conditions.

In the present embodiment, the illuminance information detected by the illuminance sensor 14 and the date and time are used as the basis to judge the sunlight conditions.

FIG. 7 is a view showing the group of packages relating to road types. The group of packages relating to road types roughly classify the road types into "general roads", "trunk roads", "intercity expressways" such as the Tokyo-Nagoya expressway and Nagoya-Kobe expressway, and "metropolitan expressways" such as the Tokyo Metropolitan Expressway and the Osaka Metropolitan Expressway and package permissions for the individual driver assistance operations for each of the road types.

In the present embodiment, the road information in front of the host vehicle detected by the external camera 13 and the road type information included in the map information of the map database 40 are used as the basis to judge the road types.

FIG. 8 is a view showing the group of packages relating to road conditions. The group of packages relating to road conditions roughly classify the road conditions into "congested" and "not congested" and package permissions for the individual driver assistance operations for each of the road conditions. Note that in the present embodiment, "congested" means the state where there are other vehicles in the host vehicle surroundings (vehicles in front or vehicles in back) and the speeds of the host vehicle 1 and the other vehicles in the host vehicle surroundings are continuously a constant speed (for example, on general roads or trunk roads, 20 km/h, while on intercity expressways or metropolitan expressways, 40 km/h) or less. On the other hand, "not congested" means a state other than congested.

In the present embodiment, the information of the 3D images generated by the LIDAR device 11, the host vehicle surrounding information detected by the milliwave radar sensors 12, obstacle information and road information in front of the host vehicle detected by the external camera 13, the congestion information included in the outside information received by the outside information receiving device 16, and the vehicle speed information detected by the vehicle speed sensor 21 are used as the basis to judge the road conditions.

FIG. 9 is a view showing a group of packages relating to the driver conditions. The group of packages relating to driver conditions roughly classify the driver conditions into sleepy, tired, overworked, distracted, and normal and package permissions for the individual driver assistance operations for each of the driver conditions. Note that in the present embodiment, "sleepy" means a condition not of an extent where the driver has to immediately stop driving, but where the concentration of the driver in the driving operation is falling due to sleepiness. "Tired" means a condition not of an extent where the driver has to immediately stop driving, but where the concentration of the driver in the driving operation is falling due to fatigue. "Distracted" means a condition where, for example, the driver is engaged in a second task other than the driving operation such as operating a mobile phone or tablet computer or other mobile device or watching a movie, looking to the side, etc. and therefore the concentration of the driver in the driving operation is falling due to reasons other than sleepiness or fatigue. "Overworked" means a condition of an extent where the driver has to immediately stop driving due to sleepiness, fatigue, or distraction due to which the concentration of the driver in the driving operation is falling. "Normal" means a condition other than sleepy, tired, overworked, and distracted.

In the present embodiment, information of the appearance of the driver detected by the driver monitor camera 31 and information of the grip on the steering wheel detected by the steering wheel touch sensor 32 are used as the basis to judge the driver condition. Specifically, while referring to the information of the grip of the steering wheel, the information of the driver (direction of face, degree of opening of eyes, etc.) is detected from the information of the appearance of the driver and the detected information of the driver is compared with the information according to the driver condition stored in advance in the ROM to thereby judge the driver condition.

Note that, the indicators for judging the driver condition are not limited to the information of the appearance of the driver or information of the grip on the steering wheel. For example, it is also possible to detect the heartbeat or pulse rate or the brainwaves etc. of the driver and compare these with the heartbeat or pulse rate or the brainwaves etc. corresponding to driver conditions stored in advance in the ROM to judge the driver condition.

FIG. 10 is a view showing a group of packages relating to the host vehicle conditions. The group of packages relating to the host vehicle conditions roughly classify the host vehicle conditions as unstable and stable and package permissions of the individual driver assistance operations for each of the host vehicle conditions. Note that, in the present embodiment, the host vehicle condition being "unstable" means continuous occurrence of pitching, rolling, yawing, etc. and disturbance of behavior of the host vehicle 1. "Pitching" means the state where the vehicle rocks back and forth about the left-right direction horizontal axis passing through the center of gravity of the vehicle. "Rolling" means the state where the vehicle rocks to the left and right about the front-back direction horizontal axis passing through the center of gravity of the vehicle. "Yawing" means the state where the vehicle rocks to the left and right about the vertical axis passing through the center of gravity of the vehicle. On the other hand, the host vehicle condition being "stable" means a state other than unstable, that is, a state where pitching, rolling, yawing, etc. do not occur and the behavior of the host vehicle 1 is not disturbed.

In the present embodiment, the acceleration information detected by the acceleration sensor 22 and the posture information of the host vehicle 1 detected by the yaw rate sensor 23 are used as the basis to judge the host vehicle condition.

Next, referring to FIG. 11 to FIG. 14, the method of providing the driver with information relating to the content of the driver assistance package authorized by the driver through the information providing device 61 will be explained.

Figure 12:
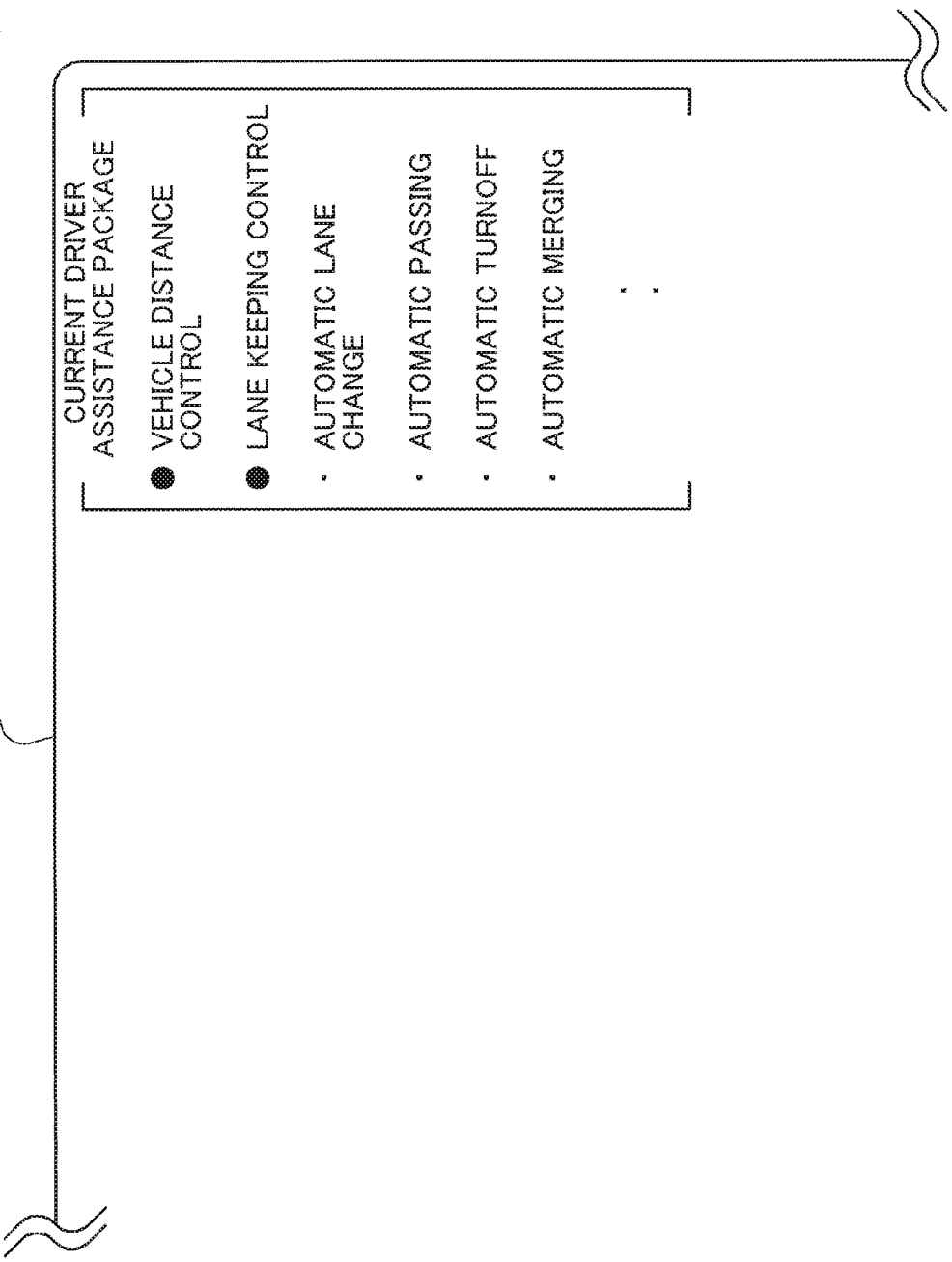
FIG. 12 is a view showing one example of display of text information of the permitted driver assistance operations in the driver assistance package on a display.
Figure 13:
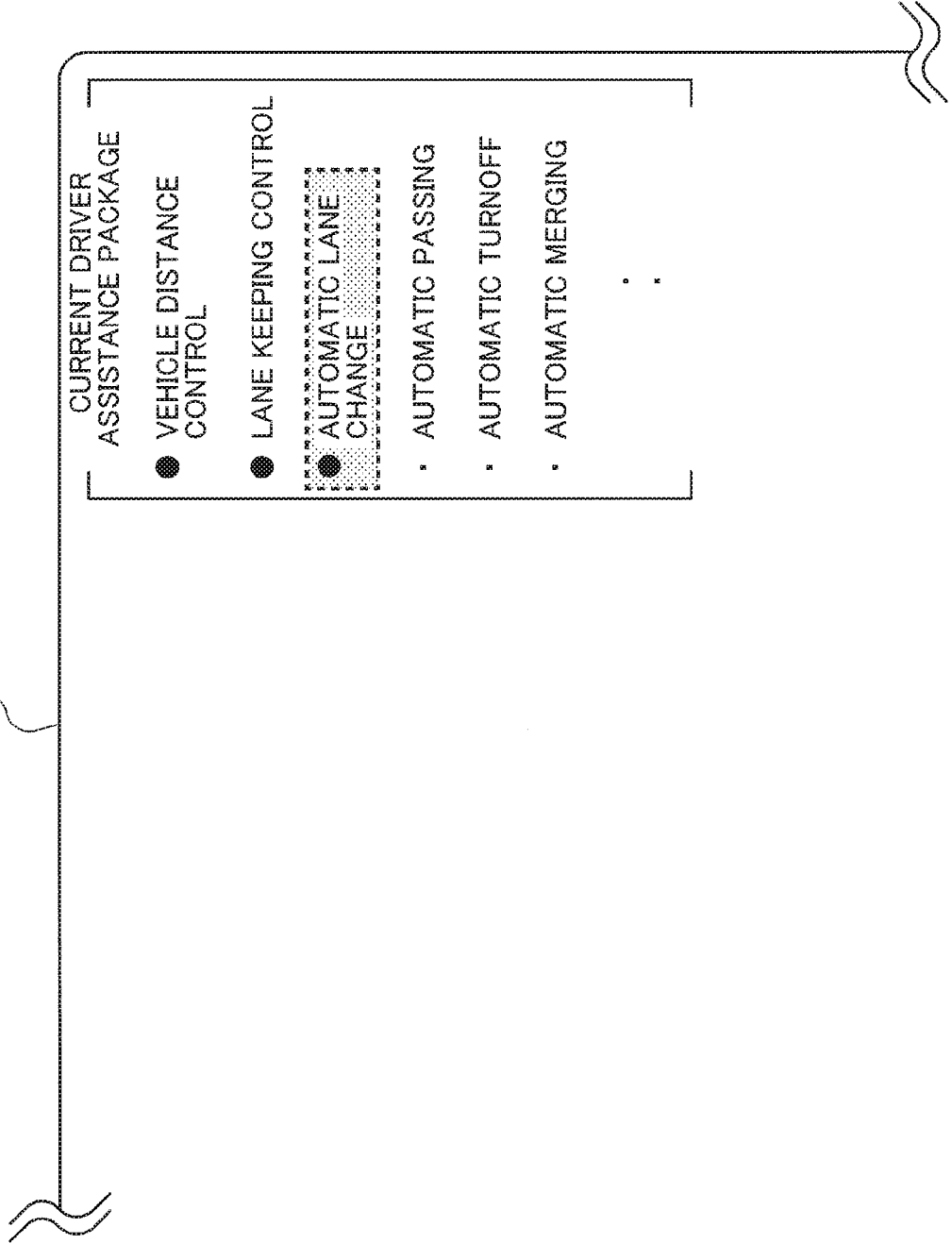
FIG. 13 is a view showing one example of display of text information of the permitted driver assistance operations in the driver assistance package on a display.

FIG. 11 to FIG. 13 are views showing examples of displaying text information of the permitted driver assistance operations in the driver assistance package on the display 611 as information relating to the content of the driver assistance package authorized by the driver. Note that FIG. 11 to FIG. 13 show examples where performance of all of the driver assistance operations having driver assistance functions is permitted. To prevent the illustrations from becoming complicated, only the text information of the driver assistance operations having driver assistance functions is taken out and shown.

As shown in FIG. 11, in the present embodiment, as information relating to the content of the driver assistance package authorized by the driver, a list of text information of the permitted driver assistance operations in the driver assistance package is displayed. Due to this, the driver can obtain a grasp at one glance of what the permitted driver assistance operations in the driver assistance package are. For this reason, it becomes easy to predict what kind of driver assistance operations will be performed during the automated driving, so it is possible to keep the driver from overriding automated driving and possible to lessen any uneasy feeling felt by the driver during automated driving.

Note that the list of text information of the driver assistance operations may be temporarily displayed when switching of the driver assistance package is authorized, when the driver touches the touch panel, when display is requested through the microphone 62, or when otherwise there is a request for display by the driver, but basically it is preferable to display it constantly. By constantly displaying the list of text information of driver assistance operations, a driver can confirm what the permitted driver assistance operations in the driver assistance package are at any time by one glance and extra operation such as operation of a touch panel at the time of confirmation becomes unnecessary.

Further, as shown in FIG. 12, when displaying a list of text information of the driver assistance operations, it is also possible to display emphasized the text information of the driver assistance operations being performed. FIG. 12 shows an example of emphasizing the text information of the driver assistance operations being performed (in this example, vehicle distance control and lane keeping control) by use of bold letters.

By displaying emphasized the text information of the driver assistance operations being performed, a driver can obtain a grasp at one glance of what the driver assistance operations being performed are in addition to the permitted driver assistance operations. For this reason, it becomes much easier to predict what kind of driver assistance operations will be performed next, so it is possible to keep the driver from overriding automated driving and possible to lessen any uneasy feeling felt by the driver during automated driving.

Further, as shown in FIG. 13, when displaying a list of text information of the driver assistance operations, it is possible to display emphasized the text information of the driver assistance operations to be performed next temporarily before the start. FIG. 13 shows the example of emphasizing the text information of the driver assistance operations being performed (in this example, vehicle distance control and lane keeping control) by bold letters and emphasizing the text information of the driver assistance operations to be performed next (in this example, automatic lane change) by making it temporarily blink.

By display emphasized the text information of the driver assistance operations to be performed next temporarily before the start, the driver can obtain a grasp of the driver assistance operations to be performed next in advance. For this reason, the driver can obtain a grasp of what kind of driver assistance operations will be performed next in advance. Due to this, it is possible to keep driver assistance operations from being performed surprising the driver and possible to lessen any uneasy feeling felt by the driver during automated driving.

Note that as shown in the example shown in FIG. 13, when displaying emphasized the text information of the driver assistance operations being performed and text information of driver assistance operations to be performed next, a method of emphasis different from the method of emphasis of text information of the driver assistance operations being performed (in this example, bold letters) (in this example, blinking) is preferably used to emphasize the text information of driver assistance operations to be performed next. By doing this, the driver can easily differentiate and obtain a grasp by one glance of driver assistance operations being performed and driver assistance operations to be performed next.

Note that, the method of emphasizing the text information is not limited to the method of making the text information bold or making it blink. For example, in addition to this, it is possible to underline the text information desired to be emphasized or display the text information desired to be emphasized by italics or to change the font or color of the text information desired to be emphasized. These methods of emphasis may also be combined. Further, it is also possible to blur text information not having to be emphasized to thereby relatively emphasize the text information not blurred.

Figure 14:
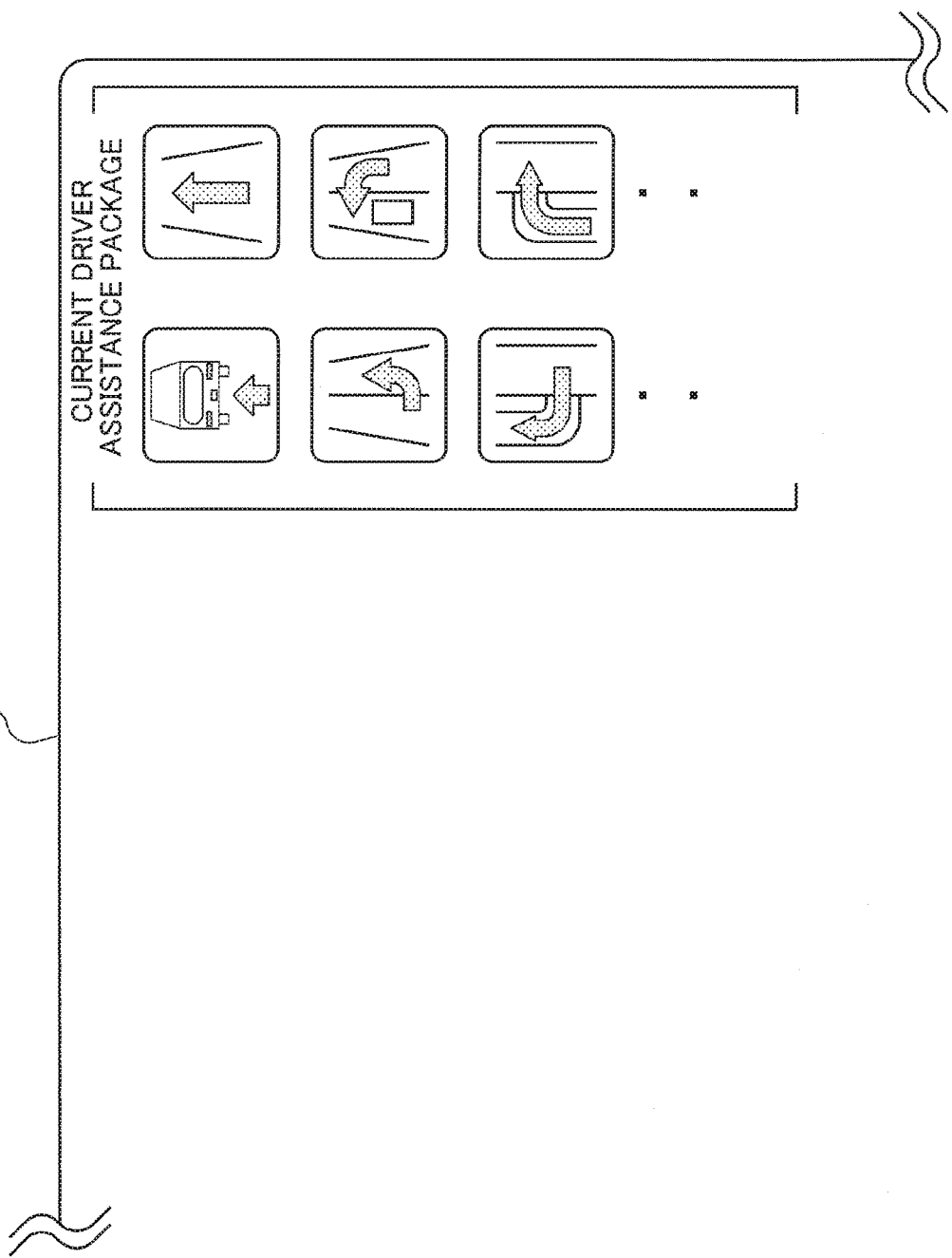
FIG. 14 is a view showing one example of display of icons representing the permitted driver assistance operations in the driver assistance package on a display.

FIG. 14 is a view showing an example of display of icons representing permitted driver assistance operations in the driver assistance package instead of text information. FIG. 14 shows the example where all of the driver assistance operations having driver assistance functions are permitted. To prevent the illustration from becoming complicated, only the icons representing the driver assistance operations having driver assistance functions are taken out and shown.

Note that in the present embodiment, the "icons representing driver assistance operations" mean contents of driver assistance operations represented by simple pictographs.

By displaying a list showing icons representing the permitted driver assistance operations in the driver assistance package as shown in FIG. 14, in the same way as when displaying a list of text information, the driver becomes able to obtain a grasp by one glance of what the permitted driver assistance operations in the driver assistance package are. For this reason, it becomes easy to predict what kind of driver assistance operations will be performed during the automated driving, so it is possible to keep the driver from overriding operations during automated driving and possible to lessen any uneasy feeling felt by the driver during automated driving. Further, compared with text information, since the contents of the driver assistance operations are represented by pictographs, it is easy to obtain a grasp of the content.

Note that, when displaying icons instead of text information as well, it is possible to temporarily display them or constantly display them. Further, in accordance with need, it is also possible to display emphasized the icons of driver assistance operations being performed and icons of driver assistance operations to be performed next. As the method of emphasizing icons, for example, the methods of making the contours of the icons bold or changing the shapes of the icons (for example, making the contours of the substantially square shaped icons shown in FIG. 14 diamond shaped or circular shaped), changing the sizes or colors of the icons, and making the icons blink may be mentioned.

Figure 15:
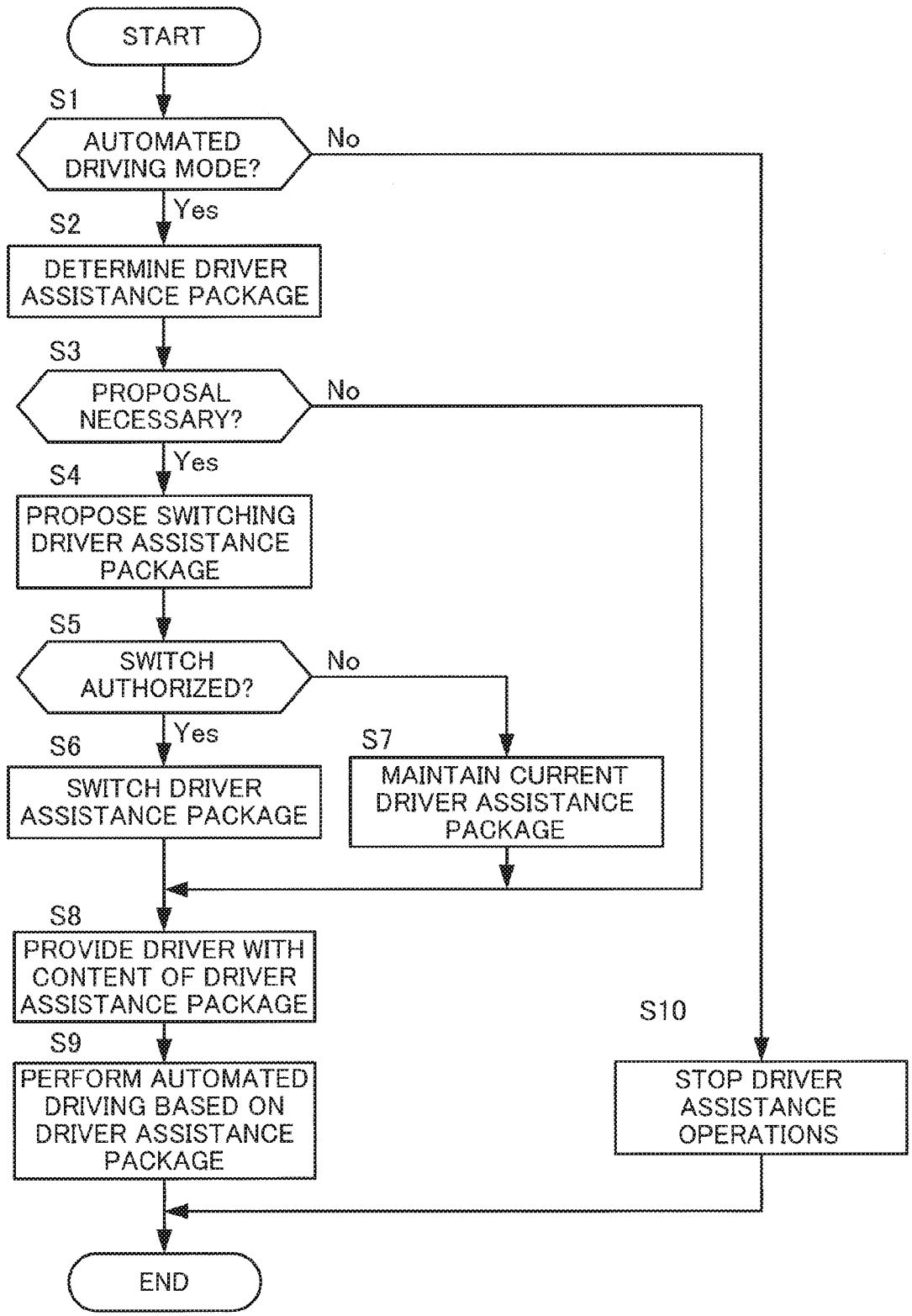
FIG. 15 is a flow chart explaining automated driving control according to a first embodiment of the present invention.

FIG. 15 is a flow chart explaining automated driving control of the present embodiment performed by the electronic control unit 80. The electronic control unit 80 repeatedly performs this routine at a predetermined processing period.

At step S1, the electronic control unit 80 judges if the driving mode of the vehicle is an automated driving mode. The electronic control unit 80 proceeds to the processing of step S2 if the driving mode of the vehicle is the automated driving mode. On the other hand, the electronic control unit 80 proceeds to the processing of step S10 if the driving mode is the manual driving mode.

At step S2, the electronic control unit 80 uses the surrounding environment information, host vehicle information, and driver information as the basis to determine the driver assistance package.

Specifically, the electronic control unit 80 first uses the surrounding environment information, host vehicle information, and driver information as the basis to identify the surrounding environmental conditions (in the present embodiment, the weather condition, sunlight condition, road type, and road condition), host vehicle condition, and driver condition.

Next, the electronic control unit 80 selects the unit package of the weather condition identified as the current weather condition from among the group of packages relating to the weather conditions. For example, when the current weather condition at step S2 is identified as "heavy rain", the electronic control unit 80 selects the unit package of "heavy rain" from the group of packages relating to the weather conditions. In the same way, the electronic control unit 80 selects the unit package of the sunlight condition identified as the current sunlight condition from among the group of packages relating to the sunlight conditions, selects the unit package of the road type identified as the current road type from among the group of packages relating to the road types, selects the unit package of the road condition identified as the current road condition from among the group of packages relating to the road conditions, selects the unit package of the driver condition identified as the current driver condition from among the group of packages relating to the driver conditions, and selects the unit package of the host vehicle condition identified as the current host vehicle condition from among the group of packages relating to the host vehicle conditions.

Finally, the electronic control unit 80 combines the selected unit packages to determine the driver assistance package. At this time, in the present embodiment, the driving assistance functions are combined by AND conditions while the visibility assistance functions and congestion assistance functions are combined by OR conditions.

Therefore, in the driver assistance operations classified as driving assistance functions, driver assistance operations permitted (circle marks) in all unit packages are permitted in the driver assistance package. On the other hand, driver assistance operations not permitted (x marks) in one or more unit packages are not permitted in the driver assistance package.

Further, in the driver assistance operations classified as visibility assistance functions and congestion assistance functions, driver assistance operations permitted in one or more unit packages are permitted in the driver assistance package. Further, driver assistance operations permitted in all unit packages are permitted in the driver assistance package. On the other hand, driver assistance operations not permitted in all of the unit packages are not permitted in the driver assistance package.

In this way, in the present embodiment, the driving assistance functions are combined by AND conditions and the visibility assistance functions and congestion assistance functions are combined by OR conditions, but the methods of combination are not limited. Combination by AND conditions or OR conditions is possible in accordance with need. Further, it is possible to combine all of the functions by AND conditions or combine them by OR conditions.

At step S3, the electronic control unit 80 judges if it is necessary to propose to the driver the driver assistance package determined at step S2. Specifically, the electronic control unit 80 judges if the driver assistance package determined at step S2 differs from the currently selected driver assistance package. The electronic control unit 80 proceeds to the processing of step S4 if the driver assistance package determined at step S2 differs from the currently selected driver assistance package. On the other hand, the electronic control unit 80 proceeds to the processing of step S8 if the driver assistance package determined at step S2 is the same as the currently selected driver assistance package.

At step S4, the electronic control unit 80 proposes switching to the driver assistance package determined at step S2 to the driver through the HMI 60. Specifically, the electronic control unit 80 displays the driver assistance package determined at step S2 on the display 611 and uses the speaker 612 to propose switching to that driver assistance package.

Here, the driver assistance package packages together in advance the permissions of the individual driver assistance operations. For this reason, when proposing a driver assistance package to the driver, for example, it is possible to propose a driver assistance package by a mode enabling a driver to switch the driver assistance package by a single operation such as by displaying a single authorization button on the touch panel. Therefore, the driver can easily switch the driver assistance package.

At step S5, the electronic control unit 80 judges if switching to the proposed driver assistance package has been authorized by the driver. Specifically, the electronic control unit 80 judges that switching to the proposed driver assistance package has been authorized by the driver when the driver indicates his wish for authorization through the HMI 60 before a predetermined time elapses from when the driver assistance package is proposed. The electronic control unit 80 proceeds to the processing of step S6 when judging that switching to the proposed driver assistance package has been authorized by the driver. On the other hand, the electronic control unit 80 proceeds to the processing of step S7 when judging that switching to the proposed driver assistance package has not been authorized by the driver.

At step S6, the electronic control unit 80 switches the driver assistance package to the driver assistance package determined at step S2.

At step S7, the electronic control unit 80 maintains the current driver assistance package.

At step S8, the electronic control unit 80 displays information relating to the content of the driver assistance package authorized by the driver on the display 611 by various methods such as explained with reference to FIG. 11 to FIG. 14 so as to provide it to the driver.

At step S9, the electronic control unit 80 automatically controls the vehicle based on the driver assistance package authorized by the driver. Specifically, it controls the vehicle so that the permitted driver assistance operations in the driver assistance package are automatically performed.

At step S10, the electronic control unit 80 stops the automatic performance of all driver assistance operations until the driving mode is switched to the automated driving mode.

Note that, in the present embodiment, the three pieces of information of the surrounding environment information, host vehicle information, and driver information were used as the basis to determine the driver assistance package, but these three pieces of information are not necessarily required. For example, if there is only a group of packages relating to the weather conditions, just the surrounding environment information may be used as the basis to determine the driver assistance package. Further, if there is only a group of packages relating to the host vehicle conditions, just the host vehicle information may be used as the basis to determine the driver assistance package. Further, if there is only a group of packages relating to the driver conditions, just the driver information may be used as the basis to determine the driver assistance package.

In this way, the driver assistance package may be determined based on the required information in accordance with the type of the group of packages stored in the ROM. That is, the driver assistance package may be determined based on at least one of the surrounding environment information, host vehicle information, and driver information in accordance with the type of the group of packages stored in the ROM.

According to the present embodiment explained above, there is provided an electronic control unit 80 (control system) in the case of controlling a vehicle equipped with a surrounding environment information acquiring device 10 for acquiring surrounding environment information relating to surrounding environment conditions of the vehicle, a vehicle information acquiring device 20 for acquiring vehicle information relating to the condition of the vehicle, a driver information acquiring device 30 for acquiring driver information relating to the condition of the driver of the vehicle, and an information providing device 61 for providing information to the driver of the vehicle. This control system is provided with an automated driving control part 90 configured to automatically perform driver assistance operations permitted by the driver among the plurality of driver assistance operations.

Further, the automated driving control part 90 is configured provided with a package determining part 91 configured to determine a driver assistance package packaging permissions of a plurality of driver assistance operations based on at least one of the surrounding environment information, vehicle information, and driver information, a package proposing part 92 configured to propose switching to a driver assistance package to a driver so as to obtain permissions for driver assistance operations permitted in the driver assistance package, a judging part 93 configured to judge if a driver has authorized switching to the driver assistance package proposed by the package proposing part 92, and a package content providing part 94 configured to provide to the driver the information relating to the content of the driver assistance package authorized by the driver through the information providing device 61.

Due to this, when performing automated driving automatically performing driver assistance operations permitted by the driver from among a plurality of driver assistance operations, when the surrounding environment conditions, host vehicle conditions, and driver conditions change, it is possible to propose a driver assistance package tailored to the changed conditions to the driver each time. The driver assistance package proposed to the driver packages permissions of the individual driver assistance operations in advance, so the driver no longer has to set permissions for individual driver assistance operations. Therefore, automated driving tailored to the surrounding environment conditions, host vehicle conditions, and driver conditions can be simply set by the driver.

Furthermore, after a proposed driver assistance package is authorized by the driver, information relating to the content of that driver assistance package is provided to the driver through the information providing device 61, so the driver can obtain a grasp of what kind of driver assistance operations will be automatically performed by the authorized driver assistance package. For this reason, it is possible to predict what kind of driver assistance operations will be performed during the automated driving, so it is possible to keep the driver from overriding automated driving and lessen any uneasy feeling felt by the driver during automated driving.

Further, according to the present embodiment, the information providing device 61 is provided with a display 611 for displaying information, and the package content providing part 94 is configured to display text information of the permitted driver assistance operations in the driver assistance package or icons representing the driver assistance operations on the display 611 as information relating to the content of the driver assistance package.

Due to this, the driver can obtain a grasp by one glance of what the permitted driver assistance operations in the driver assistance package are from the text information or icons. Therefore, it is possible to easily predict what kind of driver assistance operations will be performed during the automated driving. When displaying icons representing driver assistance operations as information relating to the content of the driver assistance package, since icons display the contents of driver assistance operations by pictographs compared with text information, it is possible to easily obtain a grasp of the contents.

Further, according to the present embodiment, the package content providing part 94 is configured to constantly display text information of the permitted driver assistance operations in the driver assistance package or icons representing the driver assistance operations on the display 611.

Due to this, the driver can confirm what the permitted driver assistance operations in the driver assistance package are from the text information by one glance at any time. For this reason, compared with, for example, the case where the driver touches a touch panel or otherwise when there is a request for display by the driver, compared with the case of temporary display at the display 611, extra operation such as operation of a touch panel at the time of confirmation becomes unnecessary.

Further, according to the present embodiment, the package content providing part 94 is configured so as to emphasize the text information of the driver assistance operations being performed or icons representing those driver assistance operations in the permitted driver assistance operations in the driver assistance package.

Due to this, the driver can obtain a grasp by one glance of the permitted driver assistance operations and also what the driver assistance operations which will be performed next are. For this reason, it is possible to predict what kind of driver assistance operations will be performed next from the driver assistance operations other than the driver assistance operations being performed. Therefore, it is possible to more easily predict what kind of driver assistance operations will be performed next, so it is possible to lessen more the uneasy feeling felt by the driver during automated driving.

Further, according to the present embodiment, the package content providing part 94 is configured to emphasize and display the text information of the driver assistance operations starting to be performed or icons representing the driver assistance operations in the permitted driver assistance operations in the driver assistance package on the display 611 before that start.

Due to this, the driver can obtain a grasp of the driver assistance operations to be performed next in advance. For this reason, since it is possible to obtain a grasp of what kind of driver assistance operations will be performed next in advance, it is possible to keep the individual driver assistance operations from being felt by the driver as being abruptly performed and possible to lessen the uneasy feeling felt by the driver during the automated operation.

Further, according to the present embodiment, the package content providing part 94 is configured to emphasize the text information of the driver assistance operations being performed or the icons representing the driver assistance operations in the permitted driver assistance operations in the driver assistance package by a first method of emphasis and to emphasize the text information of the driver assistance operations starting to be performed or the icons representing the driver assistance operations by a second method of emphasis.

Due to this, the driver can easily differentiate and obtain a grasp by a single glance of the driver assistance operations being performed and the driver assistance operations to be performed next.

Further, according to the present embodiment, the automated driving control part 90 is configured so as to automatically perform driver assistance operations permitted by the driver assistance package when the judging part 93 judges that switching to the driver assistance package has been authorized by the driver.

Due to this, the driver can determine by his own wishes whether automated driving should be performed based on the proposed driver assistance package, that is, whether just the permitted driver assistance operations in the driver assistance package proposed should be performed. For this reason, it is possible to set automated driving reflecting the wishes of the driver and possible to keep driver assistance operations not liked by the driver from being performed.

Further, according to the present embodiment, the package proposing part 92 is configured so as to propose switching to a driver assistance package to the driver in a manner such that he can switch the driver assistance package by a single operation.

Due to this, the driver can easily switch driver assistance packages. Therefore, the driver can much more easily set automated driving tailored to the surrounding environment conditions, host vehicle conditions, and driver conditions.

Second Embodiment

Next, referring to FIG. 16 to FIG. 20, a second embodiment of the present invention will be explained. The present embodiment differs from the first embodiment on the point of displaying image information corresponding to the permitted driver assistance operations in the driver assistance package as information relating to the driver assistance package authorized by the driver. Below, this point of difference will mainly be explained.

FIG. 16 to FIG. 20 are views showing examples of display of not only text information, but also image information corresponding to the permitted driver assistance operations in the driver assistance package as information relating to the driver assistance package authorized by the driver. FIG. 16 to FIG. 20 show examples where all of the driver assistance operations having driver assistance functions are permitted. To prevent complication of the illustration, only information relating to driver assistance operations having driver assistance functions (text information and image information) is taken out and described.

Figure 16:
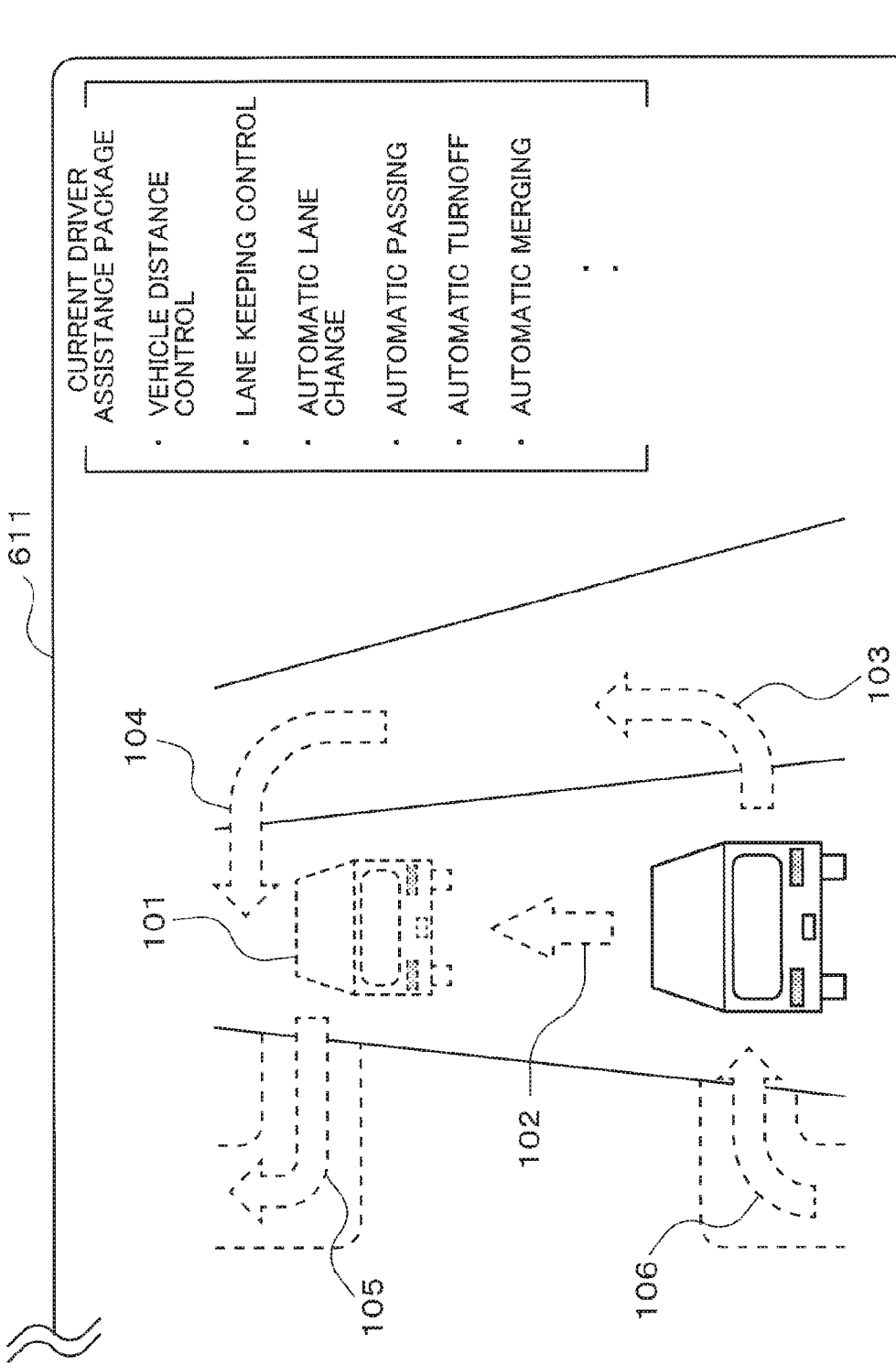
FIG. 16 is a view showing one example of display of image information corresponding to the permitted driver assistance operations in the driver assistance package in addition to text information on a display.

As shown in FIG. 16, in the present embodiment, as information relating to the content of the driver assistance package authorized by the driver, in addition to text information, image information corresponding to the permitted driver assistance operations in the driver assistance package is constantly displayed.

Note that in the present embodiment, the image information corresponding to the driver assistance operations means image information enabling intuitive recognition of the operations of driver assistance operations difficult to convey by just text information.

In FIG. 16, image information corresponding to driver assistance operations is shown by broken lines, while the host vehicle is shown by bold solid lines. As examples of image information corresponding to vehicle distance control, the image of a preceding vehicle 101 displayed in front of the vehicle etc. may be mentioned. As examples of image information corresponding to lane keeping control, an arrow mark 102 showing the advancing direction displayed on the driving lane of the vehicle etc. may be mentioned. As examples of image information corresponding to automatic lane change, an arrow 103 extending from the driving lane of the vehicle to an adjoining lane etc. may be mentioned. As examples of image information corresponding to automated passing, an arrow 104 extending from an adjoining lane of a vehicle to the driving lane for passing a preceding vehicle may be mentioned. As an example of image information corresponding to automated turn off, an arrow 105 extending from the driving lane of a vehicle to a turnoff lane etc. may be mentioned. As examples of image information corresponding to automated merging, an arrow 106 extending from the merging lane toward the driving lane etc. may be mentioned. Note that, image information relating to automated turnoff or automated merging etc. may also be displayed at the stage where the vehicle reaches near a turnoff point or merging point.

By displaying image information corresponding to the permitted driver assistance operations in the driver assistance package in this way, the driver can easily obtain a grasp by one glance of how the vehicle will move due to the permitted driver assistance operations in the driver assistance package. For this reason, it is possible to much more easily predict what kind of driver assistance operations will be performed during automated driving.

Figure 17:
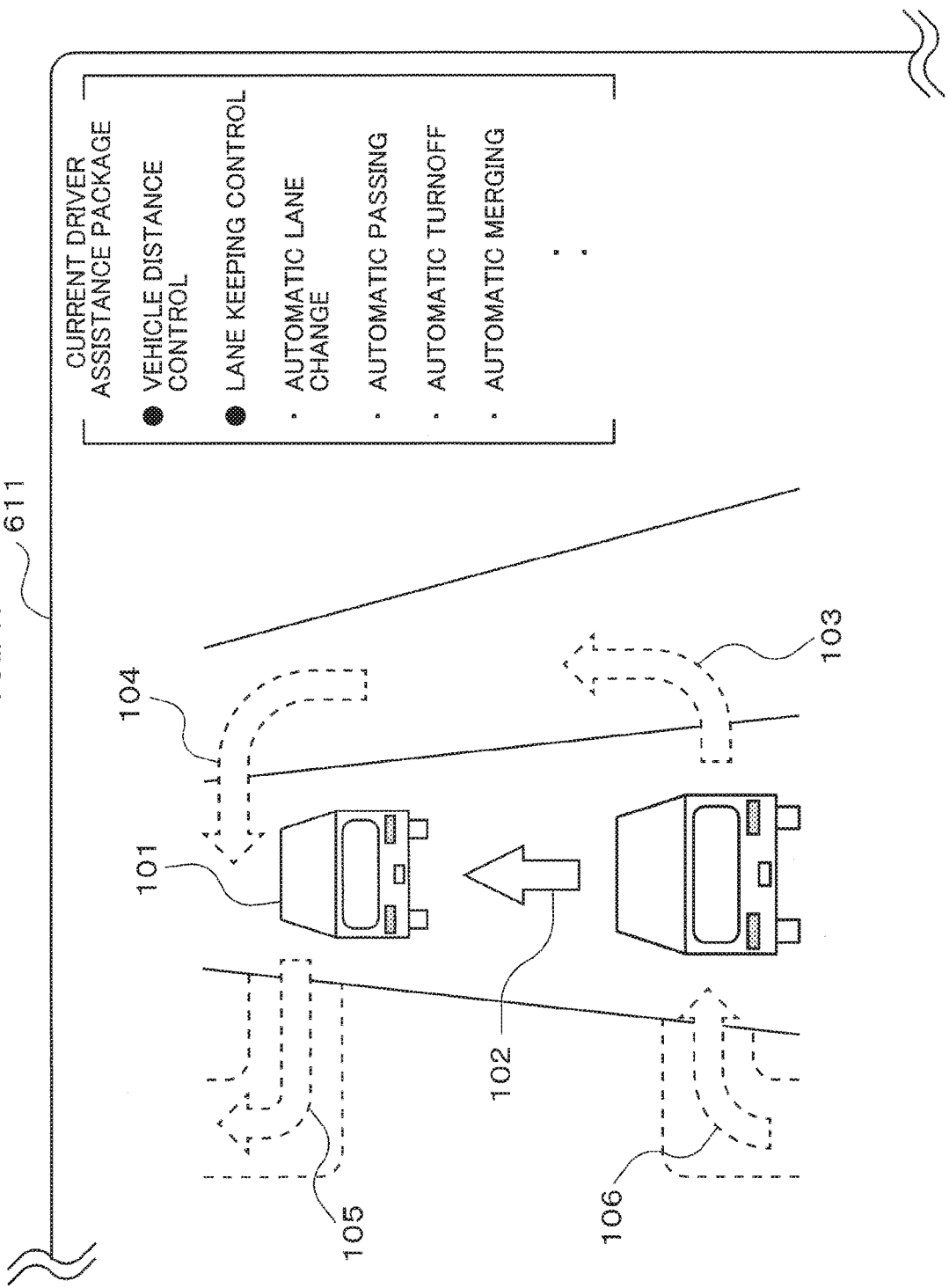
FIG. 17 is a view showing one example of display of image information corresponding to the permitted driver assistance operations in the driver assistance package in addition to text information on a display.

Further, as shown in FIG. 17, when displaying image information corresponding to the driver assistance operations, it is possible to display emphasized the image information corresponding to the driver assistance operations being performed. FIG. 17 shows the example where the image information 101, 102 corresponding to the driver assistance operations being performed (in this example, vehicle distance control and lane keeping control) is emphasized by fine solid lines.

By emphasizing image information corresponding to the driver assistance operations being performed, the driver can easily obtain a grasp by one glance of the operations of the driver assistance operations being performed.

Figure 18:
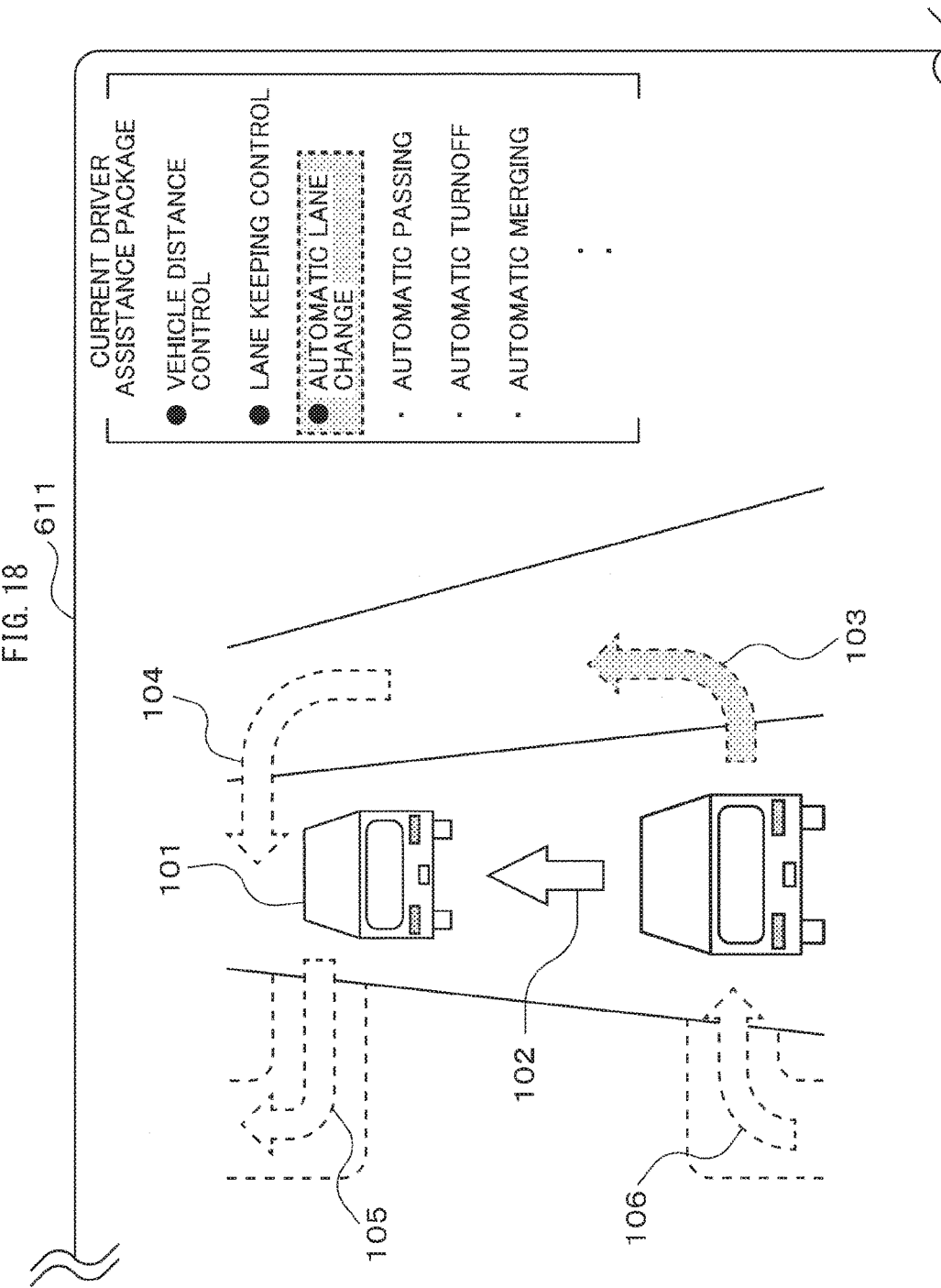
FIG. 18 is a view showing one example of display of image information corresponding to the permitted driver assistance operations in the driver assistance package in addition to text information on a display.

Further, as shown in FIG. 18, when displaying emphasized image information corresponding to the driver assistance operations, it is possible to display the image information corresponding to the driver assistance operations to be performed next temporarily before that start. FIG. 18 shows the example of emphasizing image information 101, 102 corresponding to driver assistance operations being performed (in this example, vehicle distance control and lane keeping control) by fine solid lines and emphasizing image information 103 corresponding to driver assistance operations to be performed next (in this example, automatic lane change) by temporarily making it blink. Note that while not shown, it is also possible to emphasize only the image information corresponding to the driver assistance operations to be performed next.

In this way, by displaying emphasized the image information corresponding to the driver assistance operations to be performed next in this way temporarily before that start, it becomes possible for the driver to easily obtain a grasp by one glance of the operations of the driver assistance operations to be performed next.

Figure 19:
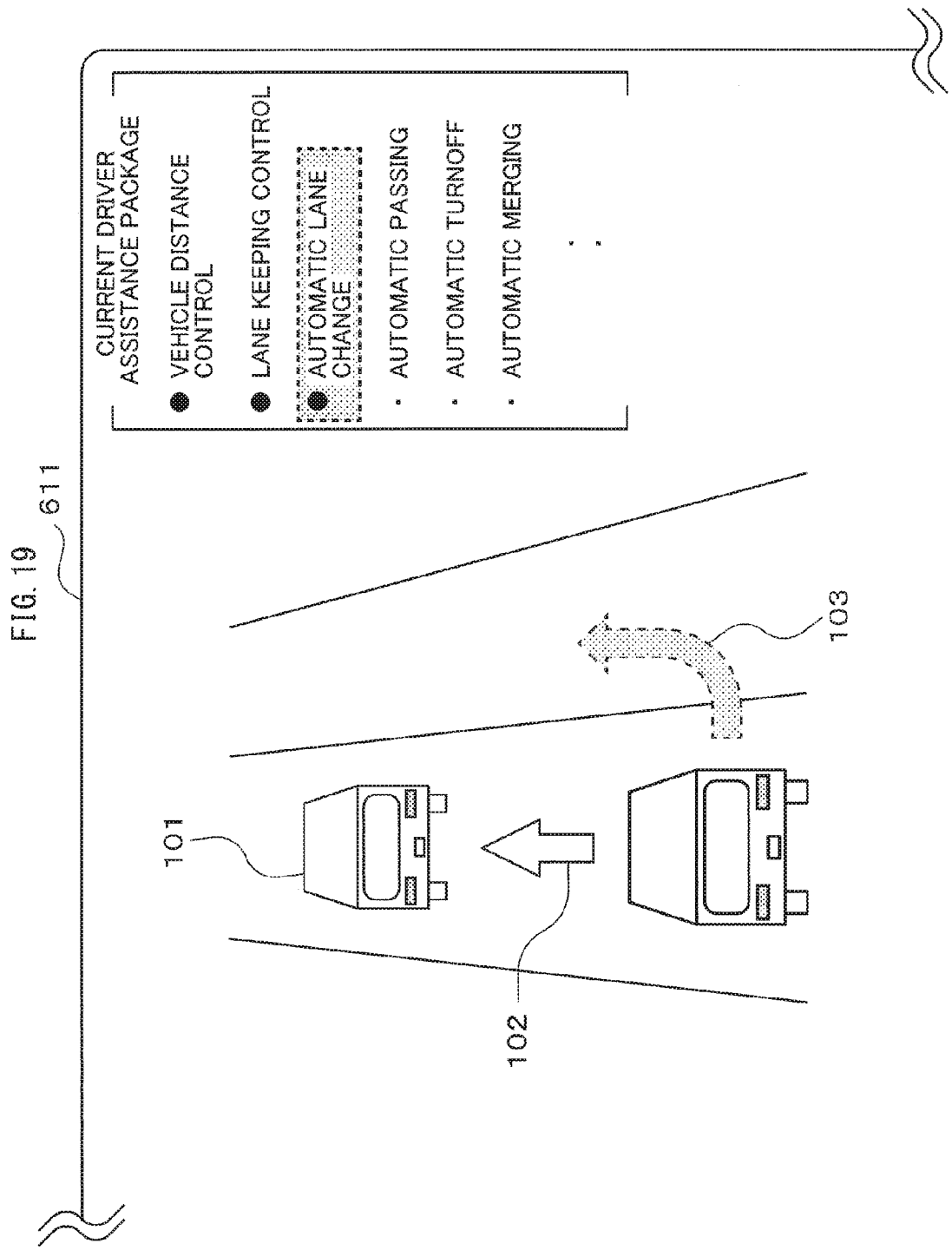
FIG. 19 is a view showing one example of display of image information corresponding to the permitted driver assistance operations in the driver assistance package in addition to text information on a display.

Further, as shown in FIG. 19, when displaying image information corresponding to the driver assistance operations, it is possible to basically constantly display only image information corresponding to the driver assistance operations being performed and display the image information corresponding to the driver assistance operations to be performed next temporarily before the start. FIG. 19 shows the example of constantly displaying image information 101, 102 corresponding to the driver assistance operations being performed (in this example, vehicle distance control and lane keeping control) by fine solid lines and displaying image information 103 corresponding to the driver assistance operations to be performed next (in this example, automatic lane change) by temporarily making it blink.

Due to this, it is possible to keep down the amount of information displayed at the display 611. For this reason, the driver can easily obtain a grasp by one glance of operations of the driver assistance operations being performed and operations of driver assistance operations to be performed next. Therefore, it becomes more easy to predict what kind of driver assistance operations will be performed next and becomes possible to easily obtain a grasp in advance of what kind of driver assistance operations will be performed next.

Note that, as shown in the example shown in FIG. 18 or FIG. 19, when emphasizing or displaying image information corresponding to the driver assistance operations being performed and image information corresponding to the driver assistance operations to be performed next, it is preferable to emphasize or display image information corresponding to driver assistance operations to be performed next by a method of emphasis or method of display (in the present example, blinking) different from the method of emphasis or method of display of image information corresponding to driver assistance operations being performed (in the present example, fine solid lines). By doing this, the driver can easily differentiate and obtain a grasp by one glance of the operations of the driver assistance operations being performed and the operations of the driver assistance operations to be performed next.

Figure 20:
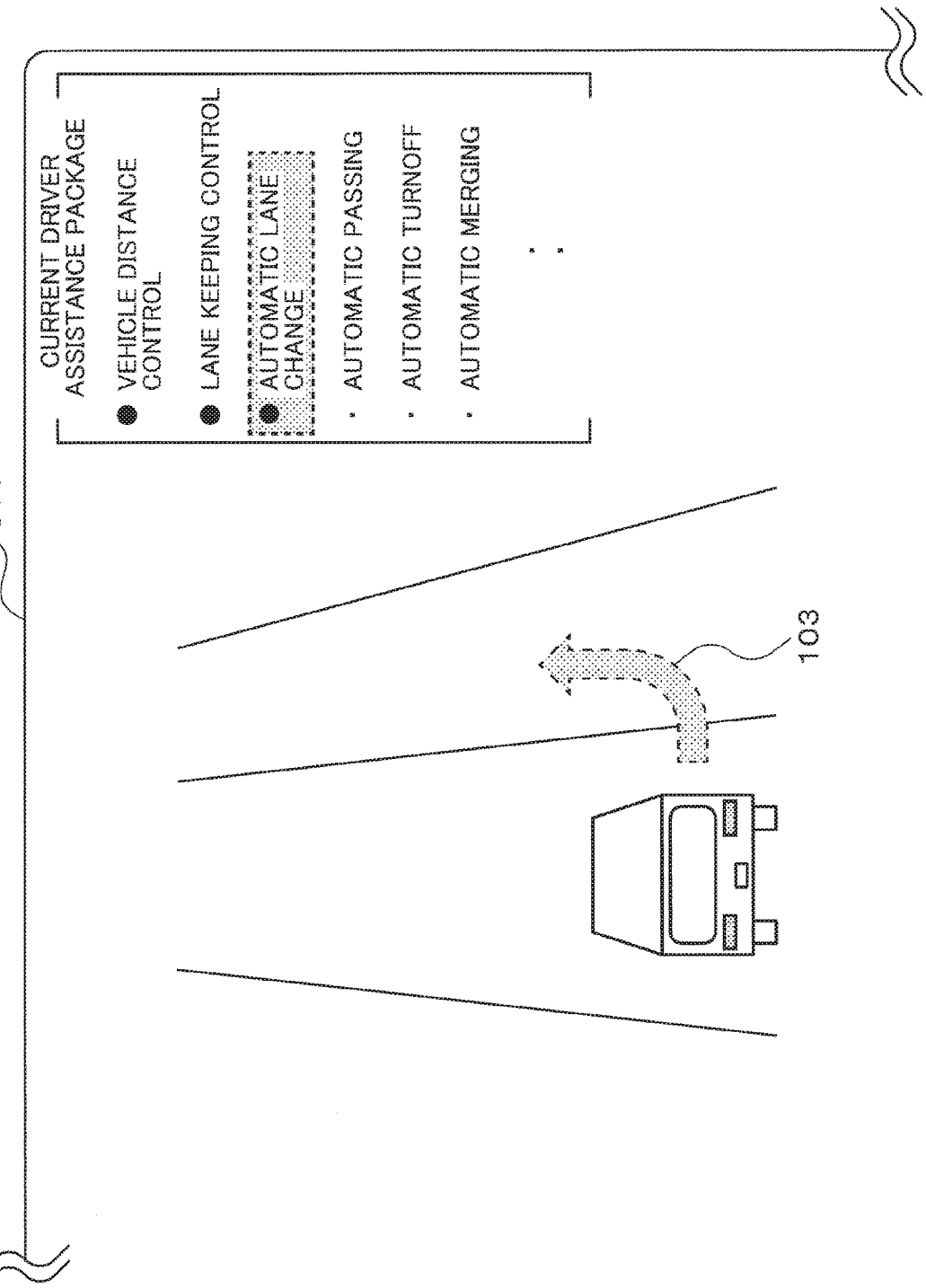
FIG. 20 is a view showing one example of display of image information corresponding to the permitted driver assistance operations in the driver assistance package in addition to text information on a display.

Further, as shown in FIG. 20, when displaying image information corresponding to the driver assistance operations, it is possible to display only image information corresponding to the driver assistance operations to be performed next temporarily before that start. FIG. 20 shows an example of displaying only image information 103 corresponding to the driver assistance operations to be performed next (in this example, automatically changing lanes) before the start of the same while making it temporarily blink.

By displaying only image information corresponding to driver assistance operations to be performed next, it is possible to keep down the information provided to the driver. For this reason, the driver can more easily obtain a grasp by one glance of the operations of the driver assistance operations to be performed next.

Note that, the method of display and method of emphasis of the image information corresponding to the driver assistance operations are not limited to the method of showing the image information by broken lines or solid lines or by making it blink as explained above. For example, in addition to this, it is also possible to change the size or color of the image information and possible to combine these methods of emphasis.

According to the present embodiment explained above, the package content providing part 94 of the automated driving control part 90 is configured to display image information corresponding to permitted driver assistance operations in the driver assistance package to the display 611.

Due to this, the driver can easily obtain a grasp by one glance of how the vehicle will move due to the permitted driver assistance operations in the driver assistance package. For this reason, it is possible to more easily predict what kind of driver assistance operations will be performed during automated driving.

Further, according to the present embodiment, the package content providing part 94 is configured so as to emphasize image information corresponding to driver assistance operations being performed in the permitted driver assistance operations in the driver assistance package.

Due to this, the driver can easily obtain a grasp by one glance of the operations of the driver assistance operations being performed.

Further, according to the present embodiment, the package content providing part 94 is configured to emphasize image information corresponding to the driver assistance operations starting to be performed in the permitted driver assistance operations in the driver assistance package temporarily before that start.

Due to this, the driver can easily obtain a grasp by one glance of the operations of the driver assistance operations being performed.

Further, according to the present embodiment, the package content providing part 94 is configured to emphasize image information corresponding to the driver assistance operations being performed in the permitted driver assistance operations in the driver assistance package by a first method of emphasis and to emphasize image information corresponding to the driver assistance operations starting to be performed by a second method of emphasis different from the first method of emphasis temporarily before that start.

Due to this, the driver can easily differentiate and obtain a grasp by one glance of operations of driver assistance operations being performed and operations of driver assistance operations to be performed next.

Further, according to the present embodiment, the package content providing part 94 is configured to constantly display only image information corresponding to the driver assistance operations being performed among the permitted driver assistance operations in the driver assistance package at the display 611.

Due to this, it is possible to keep down the amount of information displayed at the display 611. For this reason, the driver can more easily obtain a grasp by one glance of operations of the driver assistance operations being performed. Therefore, it becomes much more easy to predict what kind of driver assistance operations will be performed next.

Further, according to the present embodiment, the package content providing part 94 is configured to display the image information corresponding to the driver assistance operations starting to be performed in the permitted driver assistance operations in the driver assistance package at the display 611 temporarily before that start.

Due to this, it is possible to keep down the amount of information displayed at the display 611. For this reason, the driver can more easily obtain a grasp by one glance of the operations of the driver assistance operations to be performed next. Therefore, it is possible to easily obtain a grasp in advance of what kind of driver assistance operations will be performed next.

Further, according to the present embodiment, the package content providing part 94 is configured to display image information corresponding to the driver assistance operations being performed in the permitted driver assistance operations in the driver assistance package by a first method of display and to display image information corresponding to the driver assistance operations starting to be performed by a second method of display different from the first method of display on the display 611 temporarily before that start.

Due to this, it is possible to keep down the amount of information displayed on the display 611 and possible for the driver to easily differentiate and obtain a grasp by one glance of the operations of the driver assistance operations being performed and the operations of the driver assistance operations to be performed next.

Third Embodiment

Next, referring to FIG. 21, a third embodiment of the present invention will be explained. This embodiment differs from the first embodiment and the second embodiment on the point of providing the content of the permitted driver assistance operations in the driver assistance package to the driver as information relating to the content of the driver assistance package by sound through the speaker 612 when the driver authorizes switching to that driver assistance package. Below, this point of difference will mainly be explained.

Figure 21:
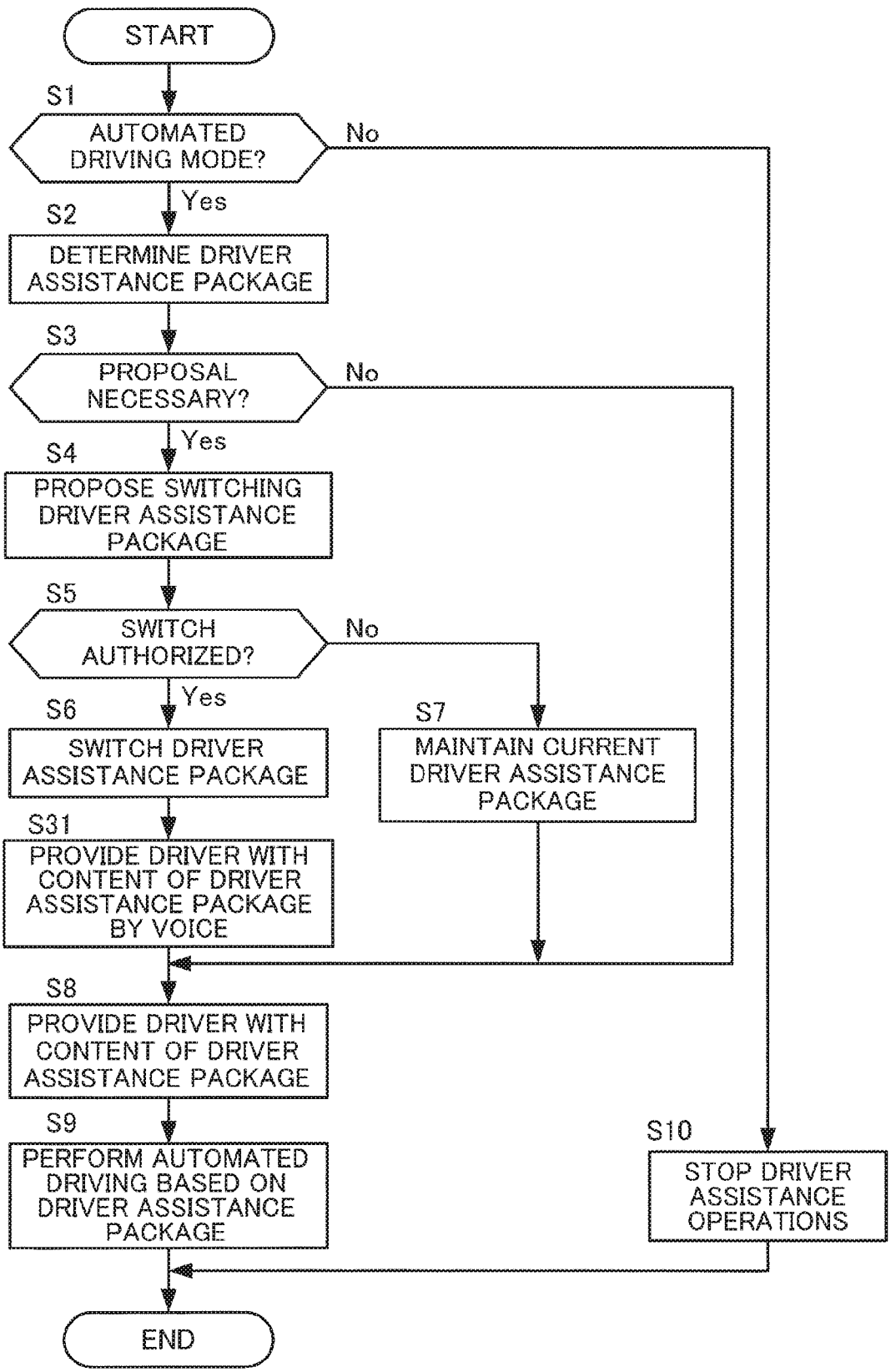
FIG. 21 is a flow chart explaining automated driving control according to a third embodiment of the present invention.

FIG. 21 is a flow chart explaining automated driving control according to the present embodiment performed by the electronic control unit 80. The electronic control unit 80 repeatedly performs this routine at a predetermined processing period.

The processing from step S1 to step S10 is similar to the first embodiment, so here the explanation will be omitted.

At step S31, the electronic control unit 80 provides information relating to the control of the driver assistance package authorized by the driver to the driver by voice through the speaker 612. Specifically, it provides the content of the permitted driver assistance operations in the driver assistance package authorized by the driver to the driver by voice through the speaker 612.

In this way, according to the present embodiment, the information providing device 61 is provided with a speaker 612 for generating sound and is configured so that the package content providing part 94 of the automated driving control part 90 provides the permitted driver assistance operations in the driver assistance package to the driver as information relating to the content of the driver assistance package by voice through the speaker 612 when the drive authorizes switching to that driver assistance package.

For this reason, when the driver assistance package is switched, the driver can obtain a grasp of the content of the permitted driver assistance operations in the driver assistance package even if not viewing the display 611.

Above, embodiments of the present invention were explained, but the above embodiments only show part of the examples of application of the present invention. They are not intended to limit the technical scope of the present invention to the specific constitutions of the embodiments.

For example, in the above embodiments, the different unit packages were combined to prepare a driver assistance package, but it is also possible to select a driver assistance program from ones combined in advance.

Further, in the second embodiment, text information of the driver assistance operations and image information corresponding to the driver assistance operations were displayed on the display 611, but it is also possible to display icons instead of text information on the display 611.

Further, the above embodiments may also be suitably combined.

REFERENCE SIGNS LIST

1. vehicle
10. surrounding environment information acquiring device
20. vehicle information acquiring device
30. driver information acquiring device
61. information providing device
611. display
612. speaker
80. electronic control unit (control system)
90. automated driving control part
91. package determining part
92. package proposing part
93. judging part
94. package content providing part

The invention claimed is:
1. A control system for a vehicle in the case of controlling a vehicle equipped with:
  a surrounding environment information acquiring device for acquiring surrounding environment information relating to surrounding environmental conditions of a host vehicle;
  a host vehicle information acquiring device for acquiring host vehicle information relating to conditions of the host vehicle;
  a driver information acquiring device for acquiring driver information relating to conditions of a driver of the host vehicle; and
  an information providing device for providing information to the driver of the host vehicle, wherein
  the control system comprises an automated driving control part configured to automatically perform driver assistance operations for which the driver has given permission among a plurality of driver assistance operations,
  the automated driving control part comprising:
  a package determining part configured to determine a driver assistance package packaging permissions for a plurality of driver assistance operations based on at least one of the surrounding environment information, the host vehicle information, and the driver information;

a package proposing part configured to propose to the driver to switch to a driver assistance package so as to obtain permissions for the individual driver assistance operations permitted in the driver assistance package;

a judging part configured to judge whether the driver has authorized switching to the driver assistance package proposed by the package proposing part; and a package content providing part configured to provide information relating to the content of the driver assistance package authorized by the driver to the driver through the information providing device.

2. The control system for a vehicle according to claim 1, wherein the information providing device comprises a display for displaying information, and the package content providing part is further configured so as to display text information of the permitted driver assistance operations in the driver assistance package or icons representing the driver assistance operations as information relating to the content of the driver assistance package on the display.

3. The control system for a vehicle according to claim 2, wherein the package content providing part is further configured to constantly display on the display the text information of the permitted driver assistance operations in the driver assistance package or icons representing the driver assistance operations.

4. The control system for a vehicle according to claim 2, wherein the package content providing part is further configured to emphasize text information of the driver assistance operations or icons representing the driver assistance operations in the permitted driver assistance operations in the driver assistance package.

5. The control system for a vehicle according to claim 2, wherein the package content providing part is further configured to emphasize text information of driver assistance operations starting to be performed or icons representing the driver assistance operations in the permitted driver assistance operations in the driver assistance package temporarily before that start.

6. The control system for a vehicle according to claim 2, wherein the package content providing part is further configured to:

emphasize text information of driver assistance operations being performed or icons representing the driver assistance operations in the permitted driver assistance operations in the driver assistance package by a first method of emphasis; and emphasize text information of driver assistance operations starting to be performed or icons representing the driver assistance operations in the permitted driver assistance operations by a second method of emphasis different from the first method of emphasis before that start.

7. The control system for a vehicle according to claim 2, wherein the package content providing part is further configured to display the image information corresponding to the permitted driver assistance operations in the driver assistance package on the display.

8. The control system for a vehicle according to claim 7, wherein the package content providing part is further configured to emphasize image information corresponding to the driver assistance operations being performed in the permitted driver assistance operations in the driver assistance package.

9. The control system for a vehicle according to claim 7, wherein the package content providing part is further configured to emphasize image information corresponding to driver assistance operations starting to be performed in the permitted driver assistance operations in the driver assistance package temporarily before that start.

10. The control system for a vehicle according to claim 7, wherein the package content providing part is further configured to:

emphasize image information corresponding to driver assistance operations being performed in the permitted driver assistance operations in the driver assistance package by a first method of evaluation; and emphasize image information corresponding to driver assistance operations starting to be performed by a second method of emphasis different from the first method of emphasis temporarily before that start.

11. The control system for a vehicle according to claim 7, wherein the package content providing part is further configured to constantly display on the display only image information corresponding to driver assistance operations being performed in the permitted driver assistance operations in the driver assistance package.

12. The control system for a vehicle according to claim 7, wherein the package content providing part is further configured to display on the display the image information corresponding to driver assistance operations starting to be performed in the permitted driver assistance operations in the driver assistance package temporarily before that start.

13. The control system for a vehicle according to claim 7, wherein the package content providing part is configured to;

display corresponding image information of driver assistance operations being performed in the permitted driver assistance operations in the driver assistance package by a first method of display; and display on the display the image information corresponding to driver assistance operations starting to be performed by a second method of display different from the first method of display temporarily before that start.

14. The control system for a vehicle according to claim 1, wherein the information providing device comprises a speaker for generating sound, and the package content providing part is further configured to propose the permitted driver assistance operations in the driver assistance package to the driver by voice through the speaker as information relating to the content of the driver assistance package when switching to the driver assistance package is authorized by the driver.

15. The control system for a vehicle according to claim 1, wherein the automated driving control part is configured to automatically perform permitted driver assistance operations in the driver assistance package when the judging part judges that switching to the driver assistance package has been authorized by the driver.

16. The control system for a vehicle according to claim 1, wherein
the package proposing part is further configured so as to propose to the driver to switch to a driver assistance package by a mode where the driver can switch to a driver assistance package by a single operation.

* * * * *